United States Patent
Sakurabu

(10) Patent No.: US 12,394,178 B2
(45) Date of Patent: Aug. 19, 2025

(54) CONTROL DEVICE, IMAGING APPARATUS, CONTROL METHOD, AND CONTROL PROGRAM

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 365 days.

(21) Appl. No.: 17/937,731

(22) Filed: Oct. 3, 2022

(65) Prior Publication Data

US 2023/0139889 A1    May 4, 2023

(30) Foreign Application Priority Data

Oct. 29, 2021  (JP) ................. 2021-178373

(51) Int. Cl.
| | |
|---|---|
| G06V 10/74 | (2022.01) |
| G06T 7/20 | (2017.01) |
| G06V 10/25 | (2022.01) |

(52) U.S. Cl.
CPC ........... *G06V 10/761* (2022.01); *G06T 7/20* (2013.01); *G06V 10/25* (2022.01); *G06T 2207/10028* (2013.01); *G06T 2207/10148* (2013.01)

(58) Field of Classification Search
CPC ........ G06V 10/761; G06V 10/25; G06T 7/20; G06T 2207/10028; G06T 2207/10148
See application file for complete search history.

(56) References Cited

U.S. PATENT DOCUMENTS

| | | | |
|---|---|---|---|
| 5,216,460 A | 6/1993 | Yoshimura et al. | |
| 2016/0212324 A1* | 7/2016 | Endo | G02B 7/09 |
| 2018/0220059 A1* | 8/2018 | Takashima | G03B 15/00 |

FOREIGN PATENT DOCUMENTS

| | | |
|---|---|---|
| JP | H04-317016 A | 11/1992 |
| JP | 2008-281701 A | 11/2008 |
| JP | 2009-273023 A | 11/2009 |
| JP | WO2017/057104 A1 | 12/2017 |
| WO | 2015/045683 A1 | 4/2015 |

OTHER PUBLICATIONS

"Notice of Reasons for Refusal" Office Action issued in JP 2021-178373; mailed by the Japanese Patent Office on Mar. 25, 2025.

* cited by examiner

*Primary Examiner* — Oneal R Mistry
*Assistant Examiner* — Nhut Huy Pham
(74) *Attorney, Agent, or Firm* — Studebaker Brackett PLLC

(57) ABSTRACT

A control device controls an imaging apparatus and includes a processor, and the processor is configured to: based on image data of a first frame and image data of a second frame among a plurality of frames obtained by the imaging apparatus, predict distance information related to a distance between the imaging apparatus and a subject in a third frame subsequent to the first frame and the second frame; and based on a state of the subject, set a settable range that is a range of a focus position of imaging of the imaging apparatus settable for the third frame.

13 Claims, 20 Drawing Sheets

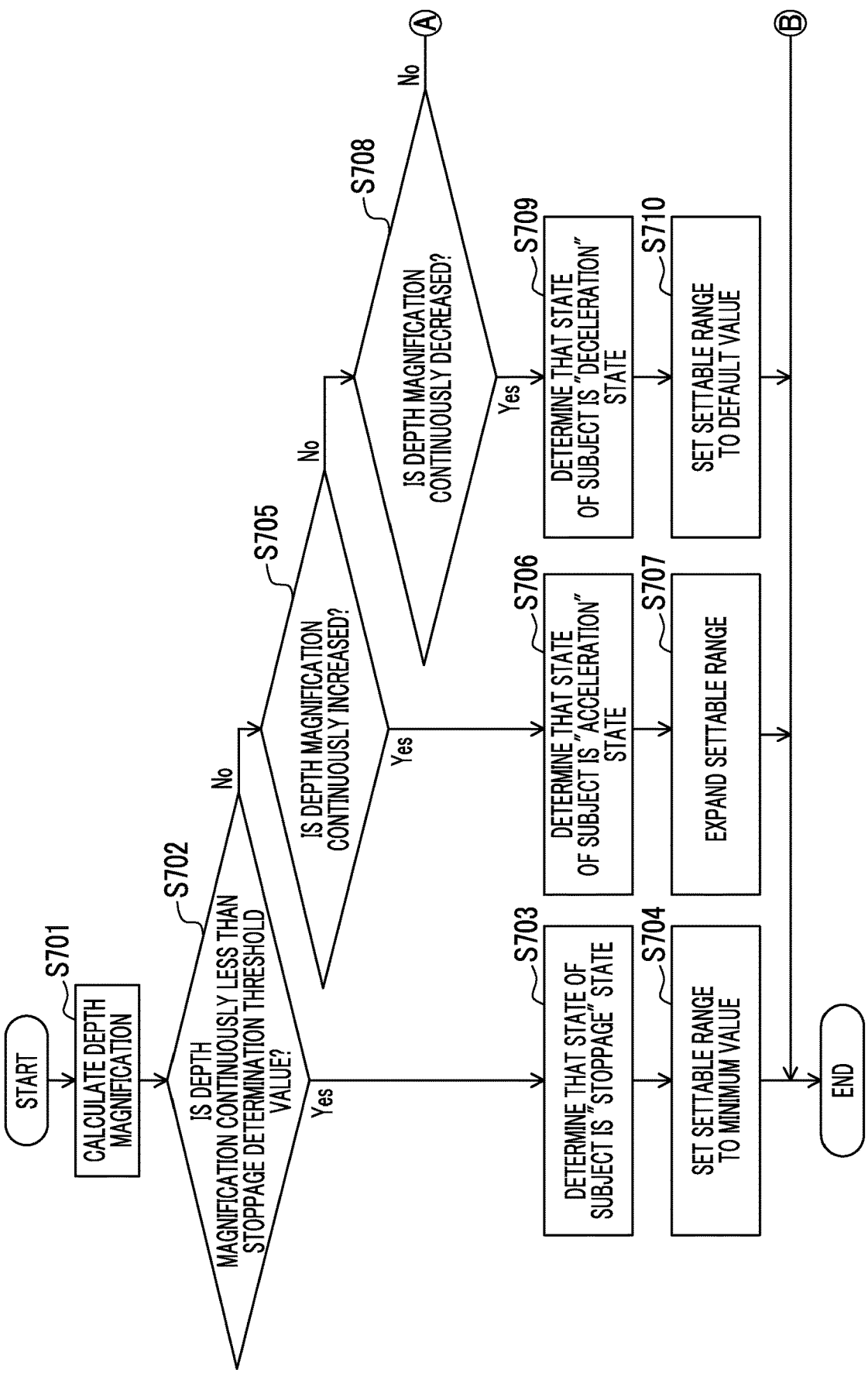

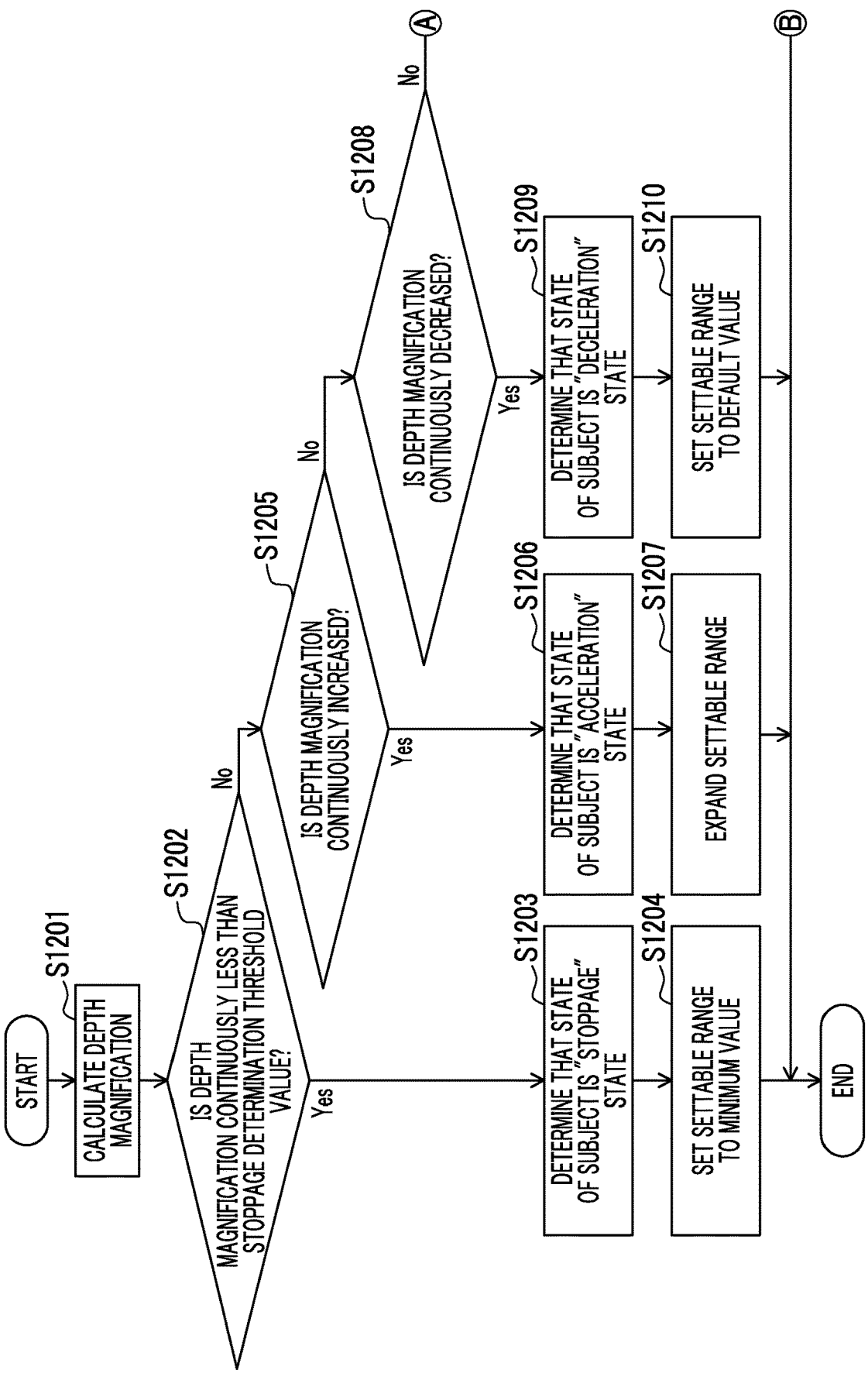

CONTROL DEVICE, IMAGING APPARATUS, CONTROL METHOD, AND CONTROL PROGRAM

CROSS-REFERENCE TO RELATED APPLICATIONS

The present application claims priority under 35 U.S.C. § 119 to Japanese Patent Application No. 2021-178373, filed on Oct. 29, 2021. The above application is hereby expressly incorporated by reference, in its entirety, into the present application.

BACKGROUND OF THE INVENTION

1. Field of the Invention

The present invention relates to a control device, an imaging apparatus, a control method, and a computer readable medium storing a control program.

2. Description of the Related Art

JPWO2017-057104A1 discloses a focusing control device that increases a movement allowable range in which movement of a focus lens is allowed, as a difference between a position of the focus lens before moving the focus lens based on a phase difference amount and a target focusing position of the focus lens based on the phase difference amount is increased. JP2009-273023A discloses an imaging apparatus that captures a live preview image by selecting a frame rate of the live preview image suitable for a movement speed of a subject and controlling an imaging element or the like at the frame rate.

SUMMARY OF THE INVENTION

One embodiment according to the disclosed technology provides a control device, an imaging apparatus, a control method, and a computer readable medium storing a control program that can improve tracking of a subject (a subject to be imaged) by a focus position.

A control device according to an aspect of the present invention is a control device that controls an imaging apparatus, the control device comprising a processor, in which the processor is configured to, based on image data of a first frame and image data of a second frame among a plurality of frames obtained by the imaging apparatus, predict distance information related to a distance between the imaging apparatus and a subject in a third frame subsequent to the first frame and the second frame, and set a settable range that is a range of a focus position of imaging of the imaging apparatus settable for the third frame based on a state of the subject.

A control method according to another aspect of the present invention is a control method by a control device that includes a processor and controls an imaging apparatus, the control method comprising predicting, by the processor, based on image data of a first frame and image data of a second frame among a plurality of frames obtained by the imaging apparatus, distance information related to a distance between the imaging apparatus and a subject in a third frame subsequent to the first frame and the second frame, and setting, by the processor, a settable range that is a range of a focus position of imaging of the imaging apparatus settable for the third frame based on a state of the subject.

A control program stored in a computer readable medium according to still another aspect of the present invention is a control program of a control device that includes a processor and controls an imaging apparatus, the control program causing the processor to execute a process comprising predicting, based on image data of a first frame and image data of a second frame among a plurality of frames obtained by the imaging apparatus, distance information related to a distance between the imaging apparatus and a subject in a third frame subsequent to the first frame and the second frame, and setting a settable range that is a range of a focus position of imaging of the imaging apparatus settable for the third frame based on a state of the subject.

According to the present invention, a control device, an imaging apparatus, a control method, and a computer readable medium storing a control program that can improve tracking of a subject by a focus position can be provided.

BRIEF DESCRIPTION OF THE DRAWINGS

FIGS. 7A and 7B are flowcharts illustrating an example of setting a settable range by the system control unit 11.

FIGS. 12A and 12B are flowcharts illustrating another example of setting a settable range 810 by the system control unit 11.

DESCRIPTION OF THE PREFERRED EMBODIMENTS

Hereinafter, an embodiment of the present invention will be described with reference to the drawings.

Figure 1:
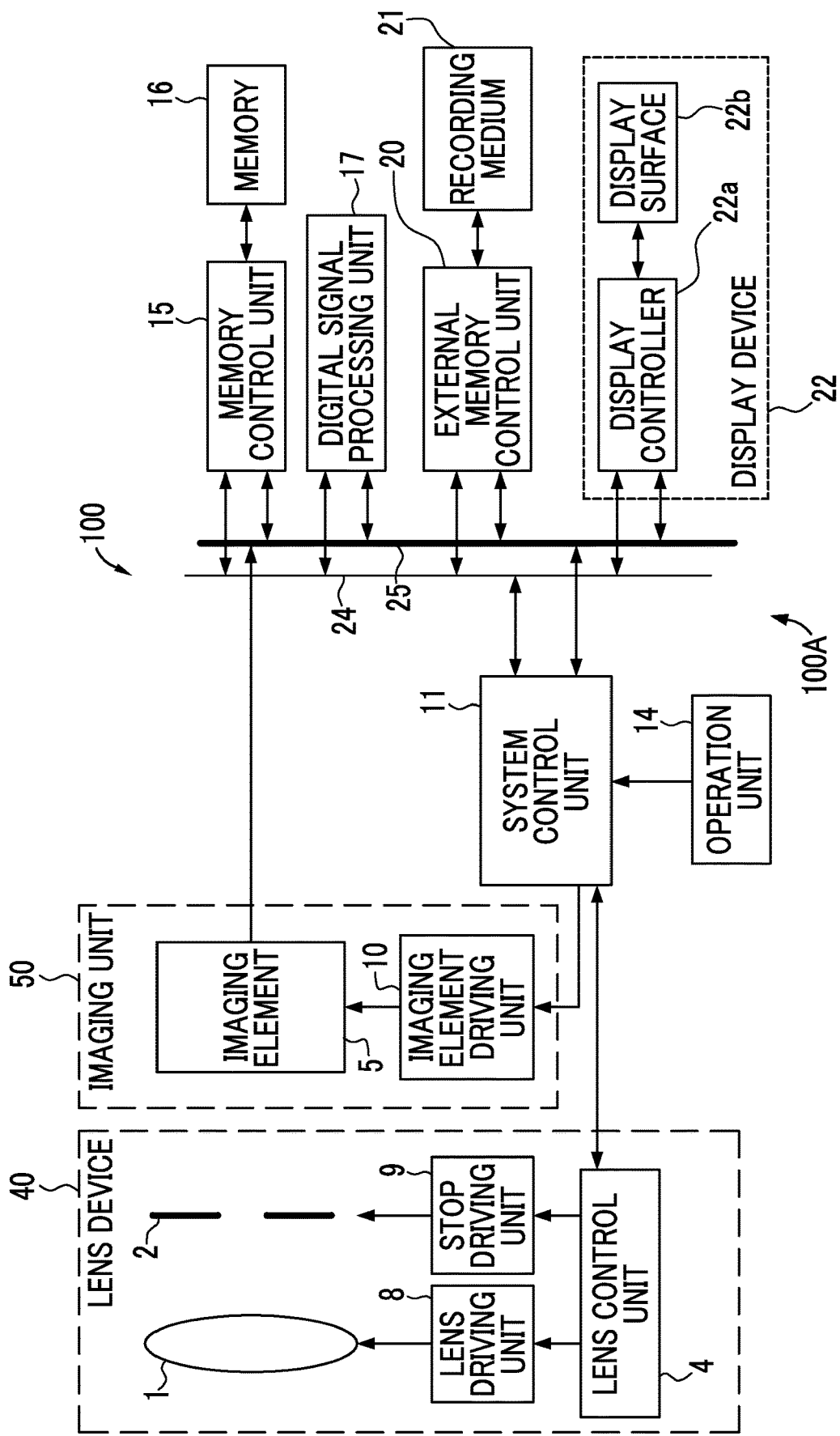
FIG. 1 is a diagram illustrating a schematic configuration of an imaging apparatus 100 that is one embodiment of an imaging apparatus according to the present invention.

Configuration of Imaging Apparatus 100 that is One Embodiment of Imaging Apparatus According to Present Invention FIG. 1 is a diagram illustrating a configuration of an imaging apparatus 100 that is one embodiment of an imaging apparatus according to the present invention.

The imaging apparatus 100 illustrated in FIG. 1 is a digital camera comprising a lens device 40 that includes an imaging lens 1, a stop 2, a lens control unit 4, a lens drive unit 8, and a stop drive unit 9; and a main body unit 100A. The main body unit 100A comprises an imaging unit 50, a system control unit 11, an operation unit 14, a display device 22, a memory 16 including a random access memory (RAM), a read only memory (ROM), and the like, a memory control unit 15 that controls data recording in the memory 16 and data readout from the memory 16, a digital signal processing unit 17, and an external memory control unit 20 that controls data recording on a recording medium 21 and data readout from the recording medium 21.

The lens device 40 may be attachable and detachable with respect to the main body unit 100A or may be integrated with the main body unit 100A. The imaging lens 1 includes a focus lens or the like that can be moved in an optical axis direction. This focus lens is a lens for adjusting a focal point of an imaging optical system including the imaging lens 1 and the stop 2 and is composed of a single lens or a plurality of lenses. Moving the focus lens in the optical axis direction changes a position of a principal point of the focus lens along the optical axis direction, and a focal position on a subject side is changed. A liquid lens of which a position of a principal point in the optical axis direction can be changed under electric control may be used as the focus lens.

The lens control unit 4 of the lens device 40 is configured to be capable of communicating with the system control unit 11 of the main body unit 100A in a wired or wireless manner. In accordance with an instruction from the system control unit 11, the lens control unit 4 changes the position of the principal point of the focus lens by controlling the focus lens included in the imaging lens 1 through the lens drive unit 8 or controls an F number of the stop 2 through the stop drive unit 9.

The imaging unit 50 comprises an imaging element 5 that images a subject through the imaging optical system including the imaging lens 1 and the stop 2, and an imaging element drive unit 10 that drives the imaging element 5.

The imaging element 5 includes an imaging surface 60 (refer to FIG. 2) on which a plurality of pixels 61 are two-dimensionally arranged, converts a subject image formed on the imaging surface 60 by the imaging optical system into pixel signals by the plurality of pixels 61, and outputs the pixel signals. A complementary metal-oxide-semiconductor (CMOS) image sensor is suitably used as the imaging element 5. Hereinafter, the imaging element 5 will be described as a CMOS image sensor.

The system control unit 11 that manages and controls the entire electric control system of the imaging apparatus 100 drives the imaging element 5 through the imaging element drive unit 10 and outputs the subject image captured through the imaging optical system of the lens device 40 as an image signal.

The imaging element drive unit 10 drives the imaging element 5 by generating a drive signal based on an instruction from the system control unit 11 and supplying the drive signal to the imaging element 5. A hardware configuration of the imaging element drive unit 10 is an electric circuit configured by combining circuit elements such as semiconductor elements.

A command signal from a user is input into the system control unit 11 through the operation unit 14. The operation unit 14 includes a touch panel integrated with a display surface 22b, described later, and various buttons and the like.

The system control unit 11 manages and controls the entire imaging apparatus 100. A hardware structure of the system control unit 11 corresponds to various processors that perform processing by executing programs including an imaging control program. The programs executed by the system control unit 11 are stored in the ROM of the memory 16.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit or the like that is a processor having a circuit configuration dedicatedly designed to execute a specific type of processing like an application specific integrated circuit (ASIC). More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

The display device 22 comprises the display surface 22b configured with an organic electro luminescence (EL) panel, a liquid crystal panel, or the like and a display controller 22a that controls display on the display surface 22b.

The memory control unit 15, the digital signal processing unit 17, the external memory control unit 20, and the display controller 22a are connected to each other through a control bus 24 and a data bus 25 and are controlled by instructions from the system control unit 11.

Schematic Configuration of Imaging Element 5 Illustrated in FIG. 1

Figure 2:
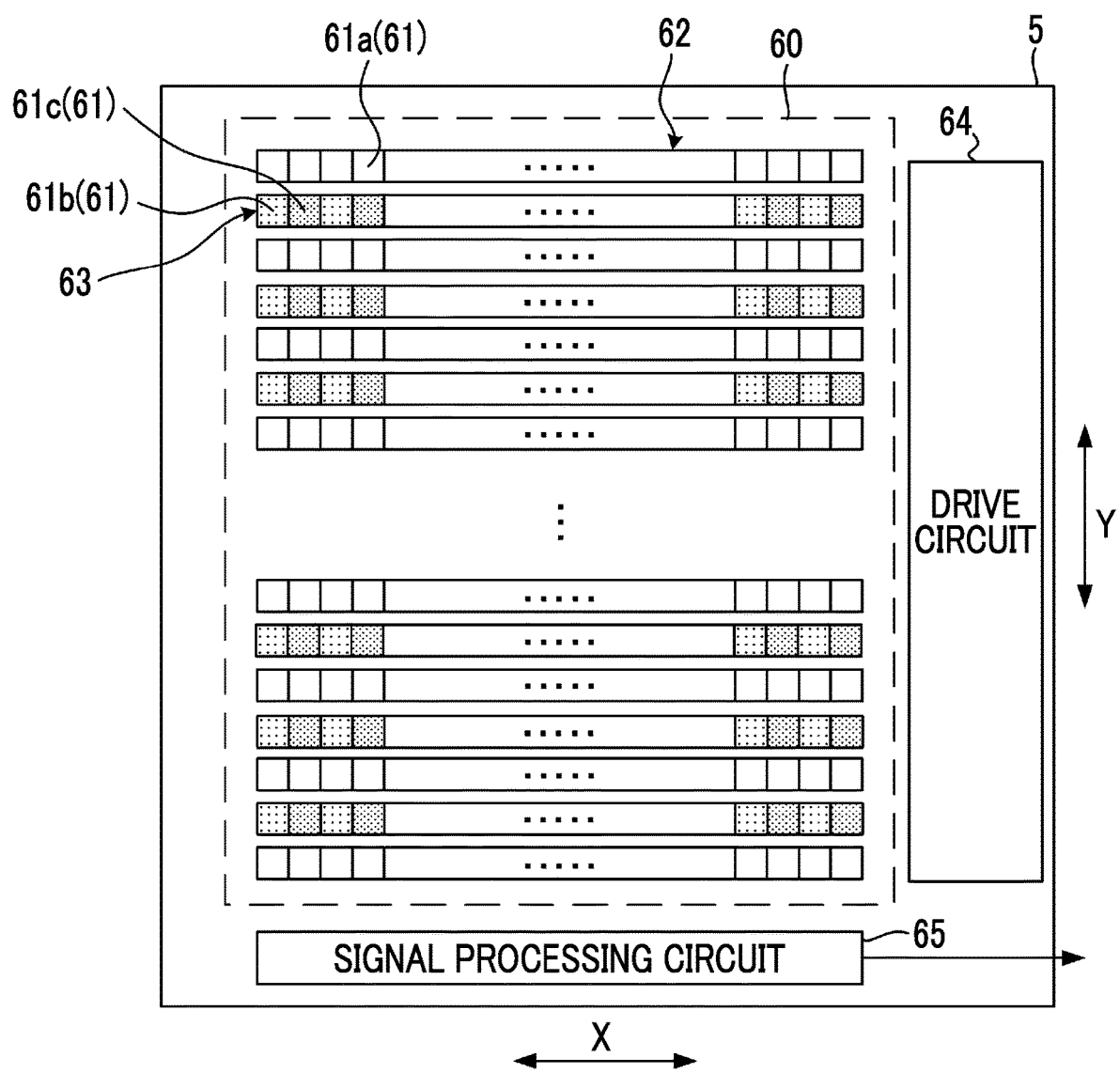
FIG. 2 is a schematic plan view illustrating a schematic configuration of an imaging element 5 illustrated in FIG. 1.

FIG. 2 is a schematic plan view illustrating a schematic configuration of the imaging element 5 illustrated in FIG. 1. The imaging element 5 includes the imaging surface 60 on which the plurality of pixels 61 are two-dimensionally arranged in a row direction X and a column direction Y orthogonal to the row direction X. The plurality of pixels 61 include a distance measurement pixel 61b for detecting a signal corresponding to a quantity of received light by receiving one of a pair of luminous fluxes passing through two different parts arranged in the row direction X in a pupil region of the imaging optical system, a distance measurement pixel 61c for detecting a signal corresponding to a quantity of received light by receiving the other of the pair of luminous fluxes, and a normal pixel 61*a* for detecting a signal corresponding to a quantity of received light by receiving both of the pair of luminous fluxes.

In the example in FIG. 2, a pixel line 62 obtained by arranging a plurality of the normal pixels 61*a* in the row direction X and a pixel line 63 obtained by alternately arranging the distance measurement pixel 61*b* and the distance measurement pixel 61*c* in the row direction X are alternately arranged in the column direction Y on the imaging surface 60. The pixel line 63 may include a plurality of pairs of the distance measurement pixel 61*b* and the distance measurement pixel 61*c* and may also include the normal pixel 61*a* in addition to these pairs. Hereinafter, the pixel line 62 and the pixel line 63 will be simply referred to as a pixel line unless otherwise distinguished. The imaging element 5 further comprises a drive circuit 64 that drives the pixels 61 arranged on the imaging surface 60, and a signal processing circuit 65 that processes a pixel signal read out to a signal line from each pixel 61 of each pixel line arranged on the imaging surface 60.

Hereinafter, in FIG. 2, an end part of the imaging surface 60 on one end side (an upper side in FIG. 2) of the column direction Y will be referred to as an upper end, and an end part of the imaging surface 60 on the other end side (a lower side in FIG. 2) of the column direction Y will be referred to as a lower end.

The drive circuit 64 performs resetting (discharge of charges accumulated in a photoelectric conversion element) of each pixel 61 included in each pixel line, reading out of a pixel signal corresponding to the charges accumulated in the photoelectric conversion element of each pixel 61 to a signal line, and the like by independently driving each pixel line based on a signal from the imaging element drive unit 10.

The signal processing circuit 65 performs correlative double sampling processing on the pixel signal read out to the signal line from each pixel 61 of the pixel line, converts the pixel signal after the correlative double sampling processing into a digital signal, and outputs the digital signal to the data bus 25 (refer to FIG. 1). The signal processing circuit 65 is controlled by the imaging element drive unit 10.

The digital signal processing unit 17 generates captured image data by performing signal processing such as demosaicing and gamma-correction processing on a pixel signal group output to the data bus 25 from the imaging element 5.

The imaging apparatus 100 is equipped with a continuous shooting mode in which a plurality of pieces of captured image data are continuously generated and recorded on the recording medium 21 in accordance with one imaging instruction.

In the continuous shooting mode, the system control unit 11 drives the imaging element 5 to image the subject by the imaging element drive unit 10 based on a rolling shutter system. Driving based on the rolling shutter system includes rolling reset driving and rolling readout driving. The rolling reset driving is driving of sequentially performing processing of starting exposure of each pixel 61 by resetting each pixel 61 of the pixel line while changing the pixel line. The rolling readout driving is driving of sequentially performing processing of reading out a signal from each pixel 61 of an exposed pixel line and finishing the exposure of the pixel line while changing the pixel line.

In the continuous shooting mode, in a case where the imaging instruction is received, the system control unit 11 continuously performs a recording imaging control of outputting a pixel signal to be used for recording of the captured image data, display of a live view image on the display surface 22*b*, and distance measurement from the imaging element 5. In addition, the system control unit 11 performs a display imaging control of outputting a pixel signal to be used for the display of the live view image on the display surface 22*b* and the distance measurement from the imaging element 5 at least once between each of a plurality of the recording imaging controls.

For example, the distance measurement is distance measurement of a phase difference method used in phase difference auto focus (AF). For example, the distance measurement is processing of performing correlation calculation between a first pixel signal group output from each distance measurement pixel 61*b* and a second pixel signal group output from each distance measurement pixel 61*c* included in the same pixel line 63 and deriving a drive amount of the focus lens necessary for focusing on a target subject based on a result of the correlation calculation.

The correlation calculation is processing of calculating an area S[d] surrounded by two data waveforms in a case where a data waveform consisting of the first pixel signal group and a data waveform consisting of the second pixel signal group are shifted by a shift amount d, by changing the shift amount d to a plurality of values.

Figure 3:
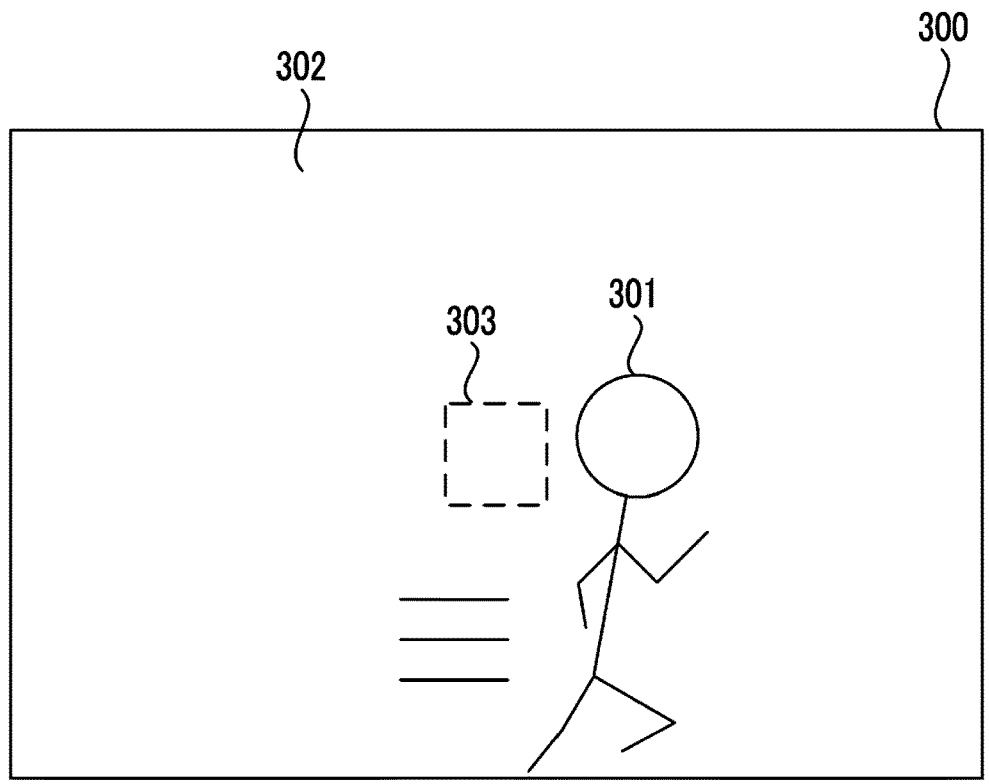
FIG. 3 is a diagram illustrating an example of a state where a subject is separated from an AF area.
Figure 4:
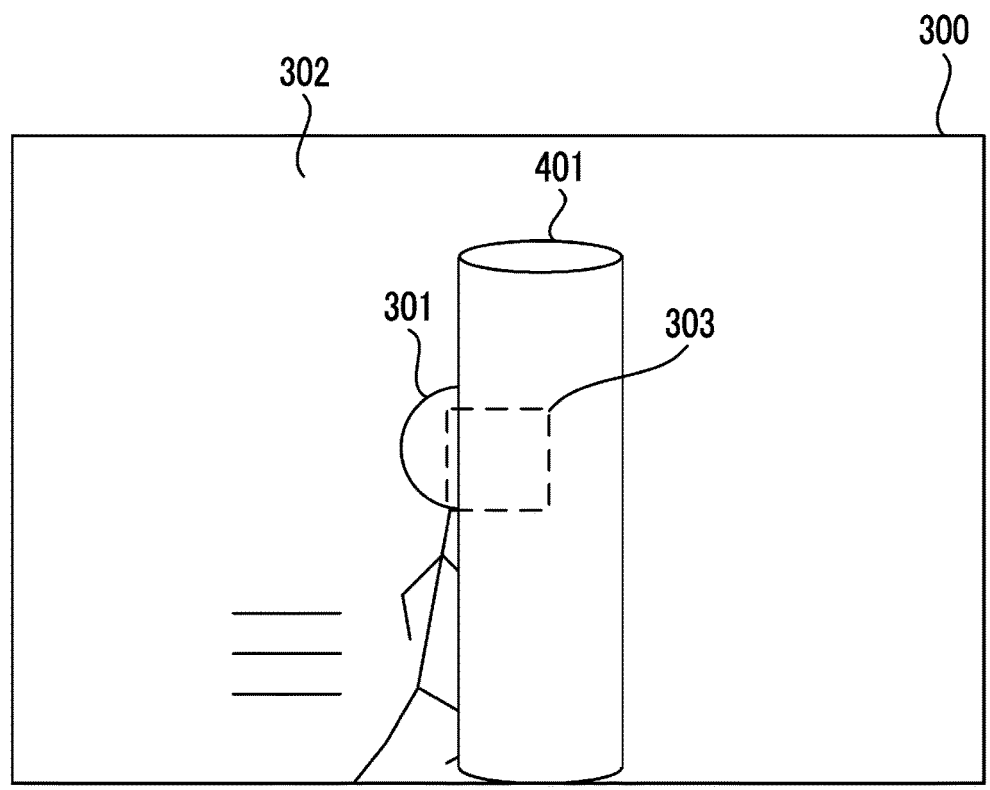
FIG. 4 is a diagram illustrating an example of a state where an obstacle enters in front of the subject in the AF area.

State where Subject is Separated from AF Area and State where Obstacle Enters in Front of Subject in AF Area FIG. 3 is a diagram illustrating an example of a state where the subject is separated from an AF area. FIG. 4 is a diagram illustrating an example of a state where an obstacle enters in front of the subject in the AF area. In FIG. 3 and FIG. 4, an image 300 is a captured image (for example, a live preview image) obtained by the imaging apparatus 100.

In the examples in FIG. 3 and FIG. 4, a subject 301 and a background 302 are reflected in the image 300. The subject 301 is the subject of imaging of the imaging apparatus 100 and is a running person in the examples in FIG. 3 and FIG. 4. The background 302 is a background (for example, a sky or a building) behind the subject 301 in a view from the imaging apparatus 100.

In addition, a frame line that indicates a currently effective AF area 303 among AF areas usable by the imaging apparatus 100 is superimposed on the image 300. In the examples in FIG. 3 and FIG. 4, the AF area 303 is one AF area positioned at a center of the imaging element 5.

For example, in imaging the moving subject 301 by the imaging apparatus 100, in a case where the subject 301 is moving in a horizontal direction in a view from the imaging apparatus 100, the subject 301 may be separated from the AF area 303 as illustrated in FIG. 3. In this case, distance measurement of the background 302 is performed in the AF area 303. Thus, setting a focus position using a distance measurement result of the AF area 303 results in a so-called rear focusing state where the background 302 is focused.

Alternatively, as illustrated in FIG. 4, an obstacle 401 may enter in front of the subject 301 in the AF area 303. In this case, distance measurement of the obstacle 401 is performed in the AF area 303. Thus, setting the focus position using the distance measurement result of the AF area 303 results in a so-called front focusing state where the obstacle 401 in front of the subject 301 is focused.

Temporally Continuous Distance Measurement Result by Imaging Apparatus 100

Figure 5:
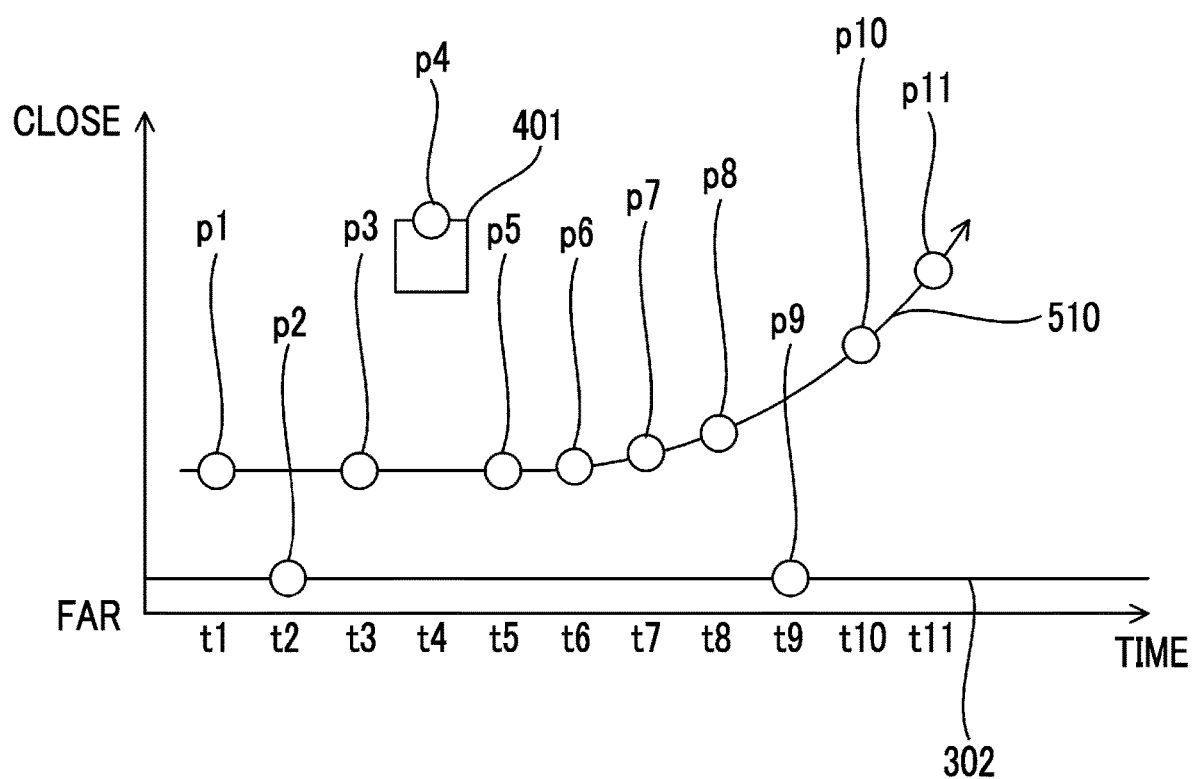
FIG. 5 is a diagram illustrating an example of a temporally continuous distance measurement result by the imaging apparatus 100.

FIG. 5 is a diagram illustrating an example of a temporally continuous distance measurement result by the imaging apparatus 100. In FIG. 5, a horizontal axis denotes time. Time points t1, t2, . . . on the horizontal axis are time points of continuous imaging frames. A vertical axis denotes a distance from the imaging apparatus 100, and the distance from the imaging apparatus 100 is decreased in an upward direction of the vertical axis.

A subject position change 510 is a change in the actual distance from the imaging apparatus 100 to the subject 301 along with an elapse of time. In the example in FIG. 5, the subject 301 is initially at a constant distance from the imaging apparatus 100 and then, gradually accelerates to approach the imaging apparatus 100.

Distance measurement results p1 to p11 are results of distance measurement performed using the AF area 303 at time points t1 to t11, respectively. In the distance measurement results p1, p3, p5 to p8, p10, and p11, distance measurement of the subject 301 is correctly performed. In the distance measurement result p2, the subject 301 is separated from the AF area 303 as illustrated in FIG. 3, and distance measurement of the background 302 is performed. In the distance measurement result p4, the obstacle 401 enters in front of the subject 301 in the AF area 303 as illustrated in FIG. 4, and distance measurement of the obstacle 401 is performed.

For example, the system control unit 11 has a subject holding function for avoiding setting of the focus position at which the background 302 is focused based on the distance measurement result p2 or setting of the focus position at which the obstacle 401 is focused based on the distance measurement result p4. Specifically, the system control unit 11 performs a control of setting a settable range of the focus position based on the current focus position and not setting a focus position separated from the settable range.

Here, in a case where the settable range is excessively wide, the distance measurement result p2 of the background 302 or the distance measurement result p4 of the obstacle 401 is included in the settable range, and the background 302 or the obstacle 401 is focused. On the other hand, in a case where the settable range is excessively narrow, there is a problem that the subject 301 remains focused even in a case where the user intentionally moves the AF area 303 from the subject 301 to another subject, or the distance measurement result of the subject 301 is separated from the settable range because of rapid acceleration or the like of the subject 301, and focus does not track the subject 301. The system control unit 11 resolves these problems by dynamically changing the settable range.

Focus Setting Processing by System Control Unit 11

Figure 6:
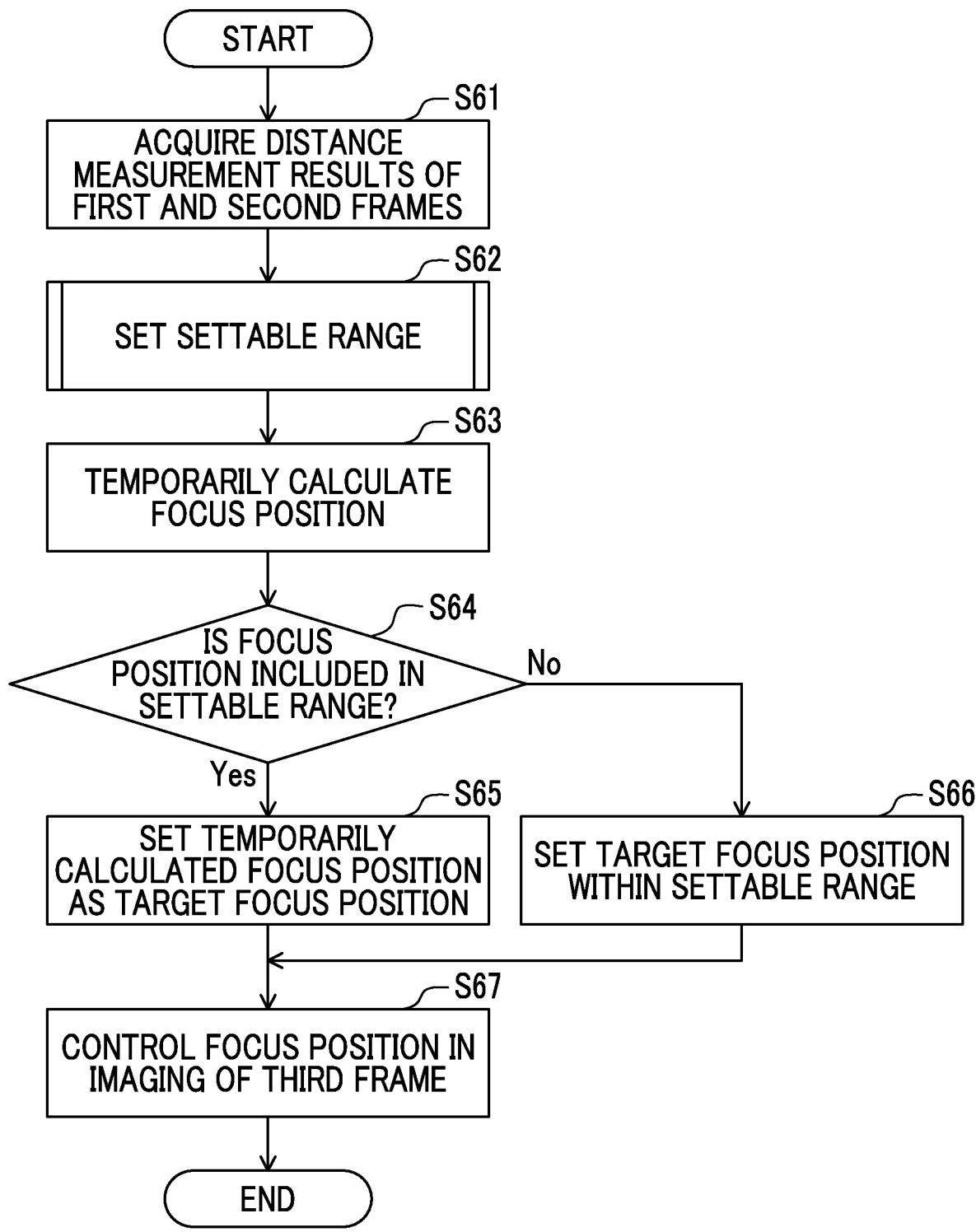
FIG. 6 is a flowchart illustrating an example of focus setting processing by a system control unit 11.

FIG. 6 is a flowchart illustrating an example of focus setting processing by the system control unit 11. For each continuous frame of imaging, for example, the system control unit 11 sets the focus position of imaging of the imaging unit 50 based on the processing illustrated in FIG. 6.

Here, in the processing in FIG. 6, the most recent frame in the past will be referred to as a second frame, a frame previous (for example, immediately previous) to the second frame will be referred to as a first frame, and a frame subsequent (for example, immediately subsequent) to the second frame will be referred to as a third frame. That is, in time series, the first frame, the second frame, and the third frame are acquired in this order by the imaging unit 50. In this case, the system control unit 11 sets the focus position in the third frame based on the processing in FIG. 6.

First, the system control unit 11 acquires the distance measurement result of each of the first frame and the second frame based on image data of each of the first frame and the second frame in the past (step S61). For example, the distance measurement result of each of the first frame and the second frame is acquired by distance measurement of a phase difference method as described above, based on the image data of each of the first frame and the second frame.

Next, the system control unit 11 determines a state or the like of the subject 301 and sets the settable range in which the focus position in the third frame can be set based on a determination result (step S62). The setting of the settable range in step S62 will be described later (for example, refer to FIGS. 7A and 7B).

Next, the system control unit 11 temporarily calculates the focus position in the third frame based on the distance measurement result of each of the first frame and the second frame acquired in step S61 (step S63). In step S63, for example, the system control unit 11 predicts the distance measurement result of the third frame by linear prediction or the like based on the distance measurement result of each of the first frame and the second frame and calculates a focus position corresponding to the predicted distance measurement result. The focus position temporarily calculated in step S63 is a focus position at which the subject 301 is predicted to be focused, and is an example of distance information related to the distance between the imaging apparatus 100 and the subject 301.

Next, the system control unit 11 determines whether or not the focus position temporarily calculated in step S63 is included in the settable range set in step S62 (step S64). In a case where the temporarily calculated focus position is included in the settable range (step S64: Yes), the system control unit 11 sets the temporarily calculated focus position as a target focus position in the third frame (step S65).

In step S64, in a case where the temporarily calculated focus position is not included in the settable range (step S64: No), the system control unit 11 sets the target focus position in the third frame within the settable range (step S66). For example, the system control unit 11 sets the target focus position set for the immediately previous second frame or the first frame as the target focus position in the third frame. Alternatively, the system control unit 11 may set the focus position corresponding to the distance measurement result predicted by linear prediction or the like with reference to also a frame previous to the first frame and the second frame as the target focus position in the third frame.

Next, the system control unit 11 controls the lens device 40 to set the focus position of the imaging lens 1 in imaging of the third frame to the target focus position set in step S65 or step S66 (step S67) and finishes the series of processing. For example, the control in step S67 is performed by outputting a control signal to the lens control unit 4 by the system control unit 11.

Setting of Settable Range by System Control Unit 11

Figure 7B:
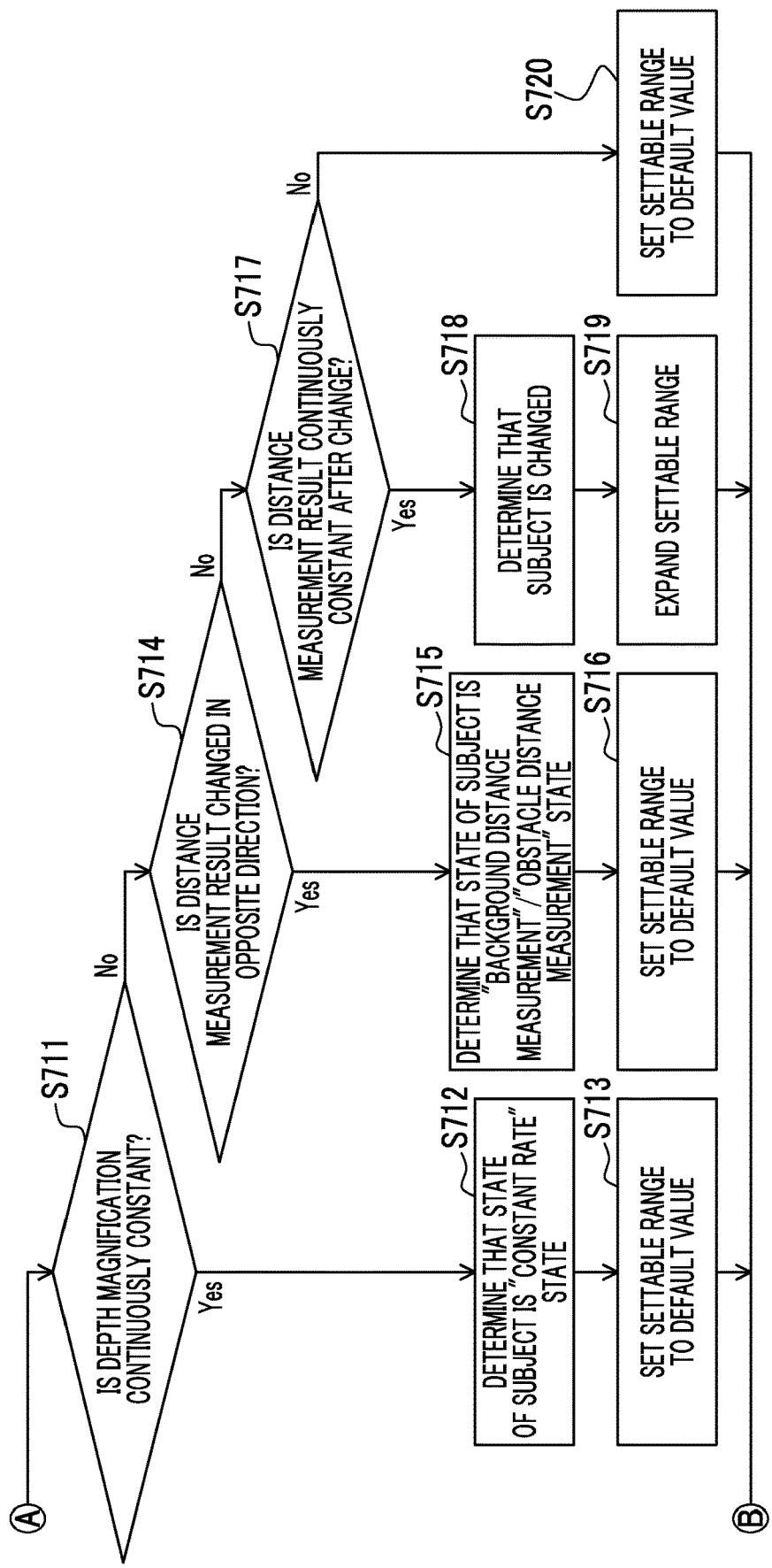

FIGS. 7A and 7B are flowcharts illustrating an example of setting the settable range by the system control unit 11. In step S62 illustrated in FIG. 6, for example, the system control unit 11 sets the settable range based on the processing illustrated in FIGS. 7A and 7B.

First, the system control unit 11 calculates the current depth magnification (step S701). The depth magnification is a ratio of an amount of change in the distance between the imaging apparatus 100 and the subject 301 between frames and a depth of field, and is an example of movement distance information that is information related to the amount of change in the distance between the imaging apparatus 100 and the subject 301.

For example, the system control unit 11 calculates the current depth magnification based on Expression (1) below. In Expression (1), an AF drive amount is the amount (absolute value) of change in the distance between the imaging apparatus 100 and the subject 301 between frames.

Specifically, the AF drive amount is a value obtained by converting a difference between the distance measurement result in the first frame and the focus position in the second frame into a drive amount of the focus lens of the imaging lens 1. The depth of field is calculated based on an F number of the stop 2, a focal length of the imaging lens 1, and the distance between the imaging apparatus 100 and the subject 301. For example, the distance between the imaging apparatus 100 and the subject 301 is the focus position in the second frame.

$$\text{Depth magnification} = \text{AF drive amount/depth of field} \quad (1)$$

Next, the system control unit 11 determines whether or not the depth magnification calculated in step S701 is continuously less than a predetermined stoppage determination threshold value (step S702). For example, the system control unit 11 acquires the most recent N depth magnifications calculated in step S701 in the past including the most recent depth magnification calculated in step S701 and performs the determination in step S702 by determining whether or not each of the acquired N depth magnifications is less than the stoppage determination threshold value. N is a natural number greater than or equal to 3. However, N in step S702 is set to a sufficiently large number (for example, greater than or equal to 4) in order to be distinguished from a state, described later, where the subject is changed.

In step S702, in a case where the depth magnification is continuously less than a first threshold value (step S702: Yes), the system control unit 11 determines that a state of the subject 301 is a "stoppage" state (step S703). The "stoppage" state is a state where the distance between the imaging apparatus 100 and the subject 301 is almost constant as in a case where the subject 301 is stopped in one place, a case where the subject 301 is moving on a circumference centered at the imaging apparatus 100, or the like.

In this case, the system control unit 11 sets the settable range in the third frame to a minimum value (step S704) and finishes the series of processing. For example, setting the settable range in the third frame to the minimum value is setting the settable range of a predetermined minimum width centered at the focus position in the immediately previous second frame as the settable range in the third frame. The minimum width is a width greater than 0.

In step S702, in a case where the depth magnification is not continuously less than the first threshold value (step S702: No), the system control unit 11 determines whether or not the depth magnification is continuously increased (step S705). For example, the system control unit 11 acquires the most recent N depth magnifications calculated in step S701 in the past including the most recent depth magnification calculated in step S701 and performs the determination in step S705 by determining whether or not the acquired N depth magnifications are increased in chronological order.

In step S705, in a case where the depth magnification is continuously increased (step S705: Yes), the system control unit 11 determines that the state of the subject 301 is an "acceleration" state (step S706). The "acceleration" state is a state where the amount of change in the distance between the imaging apparatus 100 and the subject 301 is increased as in a state where the subject 301 starts running toward the imaging apparatus 100 or away from the imaging apparatus 100, or the like.

In this case, the system control unit 11 expands the settable range in the third frame (step S707) and finishes the series of processing. For example, expanding the settable range in the third frame is setting a settable range that is centered at the focus position in the immediately previous second frame and is wider than the current settable range (for example, the settable range set for the second frame) as the settable range in the third frame.

In step S705, in a case where the depth magnification is not continuously increased (step S705: No), the system control unit 11 determines whether or not the depth magnification is continuously decreased (step S708). For example, the system control unit 11 acquires the most recent N depth magnifications calculated in step S701 in the past including the most recent depth magnification calculated in step S701 and performs the determination in step S708 by determining whether or not the acquired N depth magnifications are decreased in chronological order.

In step S708, in a case where the depth magnification is continuously decreased (step S708: Yes), the system control unit 11 determines that the state of the subject 301 is a "deceleration" state (step S709). The "deceleration" state is a state where the amount of change in the distance between the imaging apparatus 100 and the subject 301 is decreased as in a state where the subject 301 who runs toward the imaging apparatus 100 or away from the imaging apparatus 100 starts walking, or the like.

In this case, the system control unit 11 sets the settable range in the third frame to a default value (step S710) and finishes the series of processing. For example, setting the settable range in the third frame to the default value is setting the settable range of a predetermined default width centered at the focus position in the immediately previous second frame as the settable range in the third frame. The default width of the settable range is a width greater than the minimum width of the settable range.

In step S708, in a case where the depth magnification is not continuously decreased (step S708: No), the system control unit 11 determines whether or not the depth magnification is continuously constant (step S711). For example, the system control unit 11 acquires the most recent N depth magnifications calculated in step S701 in the past including the most recent depth magnification calculated in step S701 and performs the determination in step S711 by determining whether or not each difference between temporally continuous depth magnifications is less than or equal to a predetermined value.

In step S711, in a case where the depth magnification is continuously constant (step S711: Yes), the system control unit 11 determines that the state of the subject 301 is a "constant rate" state (step S712). The "constant rate" state is a state where the amount of change in the distance between the imaging apparatus 100 and the subject 301 is constant as in a state where the subject 301 is running or walking toward the imaging apparatus 100 or away from the imaging apparatus 100, or the like. In this case, the system control unit 11 sets the settable range in the third frame to the default value (step S713) and finishes the series of processing.

In step S711, in a case where the depth magnification is not continuously constant (step S711: No), the system control unit 11 determines whether or not the distance measurement result is changed in the opposite direction (step S714). For example, the system control unit 11 acquires three distance measurement results within a constant period in the past from the present. In a case where the three distance measurement results are referred to as a first distance measurement result, a second distance measurement result, and a third distance measurement result in order from the oldest, the system control unit 11 determines that the distance measurement result is changed in the opposite direction in a case where the second distance measurement result is increased by a predetermined value or more from the first distance measurement result and the third distance measurement result is decreased by a predetermined value or more from the second distance measurement result, or in a case where the second distance measurement result is decreased by a predetermined value or more from the first distance measurement result and the third distance measurement result is increased by a predetermined value or more from the second distance measurement result.

In step S714, in a case where the distance measurement result is changed in the opposite direction (step S714: Yes), the system control unit 11 determines that the state of the subject 301 is a "background distance measurement" state or an "obstacle distance measurement" state (step S715). In this case, the system control unit 11 sets the settable range in the third frame to the default value (step S716) and finishes the series of processing.

In step S715, the system control unit 11 determines that the state of the subject 301 is the "background distance measurement" state in a case where the second distance measurement result is increased by the predetermined value or more from the first distance measurement result and the third distance measurement result is decreased by the predetermined value or more from the second distance measurement result. For example, the "background distance measurement" state is a state where while the subject 301 is separated from the AF area 303 and distance measurement of the background 302 is performed instead of the subject 301, the subject 301 enters the AF area 303 again and distance measurement of the subject 301 is performed.

In addition, in step S715, the system control unit 11 determines that the state of the subject 301 is the "obstacle distance measurement" state in a case where the second distance measurement result is decreased by the predetermined value or more from the first distance measurement result and the third distance measurement result is increased by the predetermined value or more from the second distance measurement result. For example, the "obstacle distance measurement" state is a state where while the obstacle 401 in front of the subject 301 in a view from the imaging apparatus 100 enters the AF area 303 and distance measurement of the obstacle 401 is performed instead of the subject 301, the obstacle 401 is separated from the AF area 303 and distance measurement of the subject 301 is performed again.

In step S714, in a case where the distance measurement result is not changed in the opposite direction (step S714: No), the system control unit 11 determines whether or not the distance measurement result is continuously constant after change (step S717). For example, the system control unit 11 acquires four distance measurement results within a constant period in the past from the present. In a case where the four distance measurement results are referred to as a first distance measurement result, a second distance measurement result, a third distance measurement result, and a fourth distance measurement result in order from the oldest, the system control unit 11 determines that the distance measurement result is continuously constant after change in a case where a difference between the first distance measurement result and the second distance measurement result is greater than or equal to a predetermined value, a difference between the second distance measurement result and the third distance measurement result is less than or equal to a predetermined value, and a difference between the third distance measurement result and the fourth distance measurement result is less than or equal to a predetermined value.

In step S717, in a case where the distance measurement result is continuously constant after change (step S717: Yes), the system control unit 11 determines that the user has intentionally changed the subject from the subject 301 to another subject (step S718). In this case, the system control unit 11 expands the settable range in the third frame (step S719) and finishes the series of processing.

In step S717, in a case where the distance measurement result is not continuously constant after change (step S717: No), the system control unit 11 sets the settable range in the third frame to the default value (step S720) and finishes the series of processing.

In steps S710, S713, S716, and S720, since the subject 301 is moving, the immediately previous (for example, in the immediately previous second frame) settable range has the default value or is expanded from the default value. Accordingly, setting the settable range to the default value in steps S710, S713, S716, and S720 maintains or reduces the settable range.

As illustrated in FIGS. 7A and 7B, in a case where the depth magnification (movement distance information) in a plurality of frames obtained by the imaging unit 50 is continuously less than a predetermined value, the system control unit 11 determines that the state of the subject 301 is the "stoppage" state and sets the settable range to the minimum value. Accordingly, a case where the subject 301 is separated from the AF area 303 and distance measurement of the background 302 is performed, or a case where the obstacle 401 enters the AF area 303 and distance measurement of the obstacle 401 is performed can be accurately detected. Thus, it is possible to suppress focusing of the background 302 or the obstacle 401 and improve tracking of the subject 301 by the focus position.

In addition, in a case where the depth magnification (movement distance information) in the plurality of frames obtained by imaging unit 50 is continuously increased, the system control unit 11 determines that the state of the subject 301 is the "acceleration" state and expands the settable range. Accordingly, it is possible to expand the settable range in a situation where the distance between the imaging apparatus 100 and the subject 301 is not easily predicted because of a change in motion of the subject 301, and suppress separation of the focus position temporarily calculated based on the distance measurement result of each of the first frame and the second frame from the settable range because of acceleration of the subject 301. Thus, it is possible to improve tracking of the subject 301 by the focus position.

In addition, in a case where the depth magnification (movement distance information) in the plurality of frames is continuously decreased, the system control unit 11 determines that the state of the subject 301 is the "deceleration" state and maintains or reduces the settable range. Accordingly, the settable range is maintained or reduced in a situation where the subject 301 is approaching the stoppage state, and it is possible to accurately detect a case where the subject 301 is separated from the AF area 303 and distance measurement of the background 302 is performed, or a case where the obstacle 401 enters the AF area 303 and distance measurement of the obstacle 401 is performed. Thus, it is possible to suppress focusing of the background 302 or the obstacle 401 and improve tracking of the subject 301 by the focus position.

In addition, in a case where a difference in the depth magnification (movement distance information) among the plurality of frames is within a predetermined range, the system control unit 11 determines that the state of the subject 301 is the "constant rate" state and maintains or reduces the settable range. Accordingly, the settable range is maintained or reduced in a situation where the distance between the imaging apparatus 100 and the subject 301 is easily predicted, and it is possible to accurately detect a case where the subject 301 is separated from the AF area 303 and distance measurement of the background 302 is performed, or a case where the obstacle 401 enters the AF area 303 and distance measurement of the obstacle 401 is performed. Thus, it is possible to suppress focusing of the background 302 or the obstacle 401 and improve tracking of the subject 301 by the focus position.

In addition, in a case where a direction of change in the distance measurement result (distance information) among the plurality of frames is switched to the opposite direction, the system control unit 11 determines that the state of the subject 301 is the "background distance measurement" state or the "obstacle distance measurement" state and maintains or reduces the settable range. Accordingly, the settable range is maintained or reduced in a situation where distance measurement of the background 302 or the obstacle 401 is temporarily performed and distance measurement of the subject 301 is currently performed, and it is possible to accurately detect a case where the subject 301 is separated from the AF area 303 and distance measurement of the background 302 is performed, or a case where the obstacle 401 enters the AF area 303 and distance measurement of the obstacle 401 is performed. Thus, it is possible to suppress focusing of the background 302 or the obstacle 401 and improve tracking of the subject 301 by the focus position.

In addition, in a case where the distance measurement result (distance information) in the plurality of frames is continuously within a predetermined range after change by a predetermined value or more, the system control unit 11 determines that the subject is intentionally changed and expands the settable range. Accordingly, the settable range is expanded in a situation where the subject is changed and a new subject needs to be focused, and it is possible to suppress continuous focusing of the subject 301 before change regardless of the change of the subject.

In addition, in the processing illustrated in FIGS. 7A and 7B, the system control unit 11 may not use the distance measurement result separated from the set settable range in the determination or the like of the state of the subject 301. Accordingly, for example, it is possible to suppress erroneous determination of the state of the subject 301 using the distance measurement result of the background 302 or the obstacle 401.

While steps S703, S706, S709, S712, S715, and S718 are included in processing of recognizing each state such as the "stoppage" state by the system control unit 11, the system control unit 11 may perform the processing not including steps S703, S706, S709, S712, S715, and S718 because the settable range may be set by transitioning to any of steps S704, S707, S710, S713, S716, and S719 in accordance with a determination result in steps S702, S705, S708, S711, S714, and S717.

Minimization of Settable Range in "Stoppage" State

Figure 8:
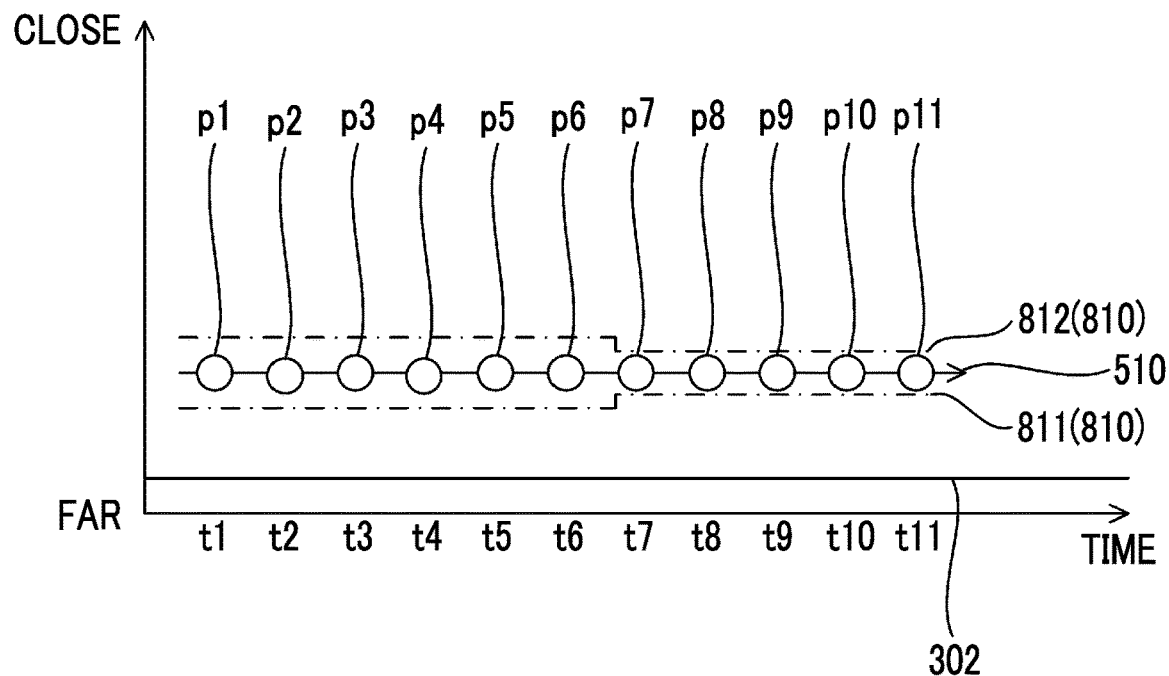
FIG. 8 is a diagram illustrating an example of minimizing the settable range in a "stoppage" state.

FIG. 8 is a diagram illustrating an example of minimizing the settable range in the "stoppage" state. A settable range 810 is the settable range set in step S62 (specifically, the processing in FIGS. 7A and 7B) in FIG. 6. For example, the settable range 810 is defined by a lower limit value 811 and an upper limit value 812. That is, a range of greater than or equal to the lower limit value 811 and less than or equal to the upper limit value 812 is the settable range 810.

In the example in FIG. 8, the distance between the imaging apparatus 100 and the subject 301 is constant. In this case, the system control unit 11 determines that the state of the subject 301 is the "stoppage" state and sets the settable range 810 to the minimum value. Accordingly, it is possible to suppress focusing of the background 302 or the obstacle 401 and improve tracking of the subject 301 by the focus position.

Expansion of Settable Range in "Acceleration" State

Figure 9:
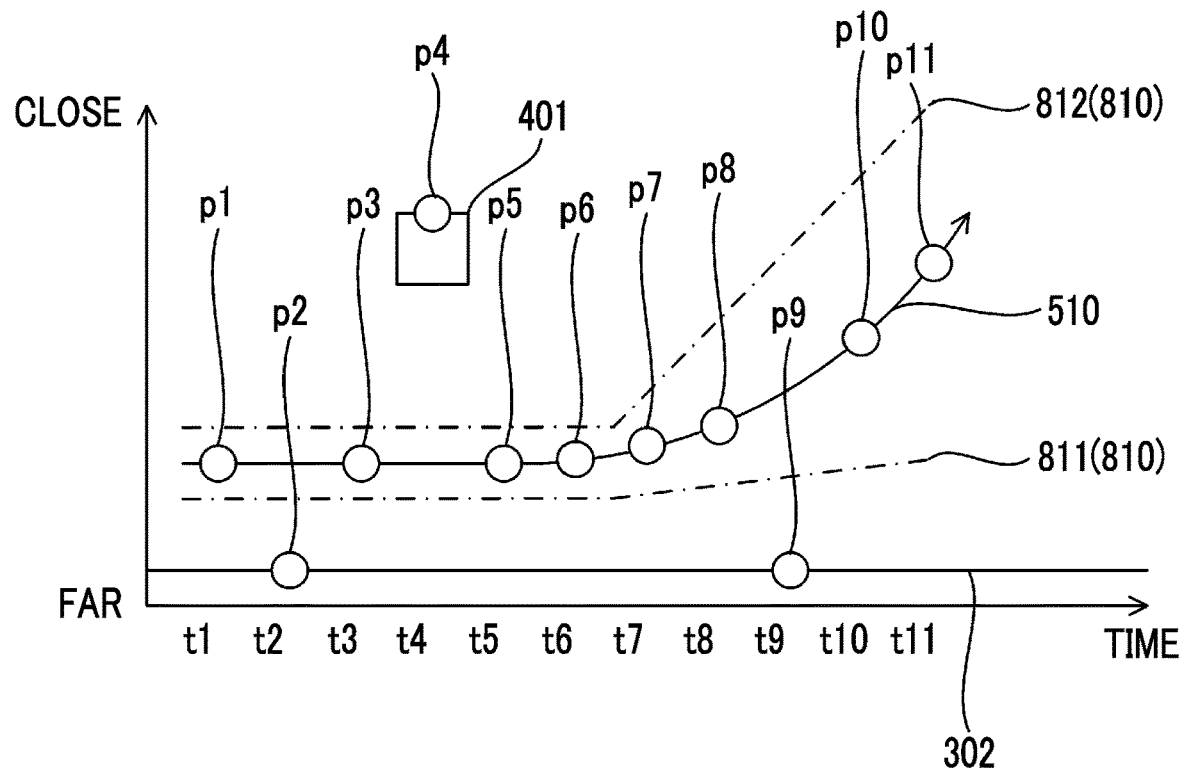
FIG. 9 is a diagram illustrating an example of expanding the settable range in an "acceleration" state.

FIG. 9 is a diagram illustrating an example of expanding the settable range in the "acceleration" state. In the example in FIG. 9, the subject 301 is accelerating to approach the imaging apparatus 100. In this case, the system control unit 11 determines that the state of the subject 301 is the "acceleration" state and expands the settable range 810. Accordingly, it is possible to suppress separation of the distance measurement result of the subject 301 accelerating to approach the imaging apparatus 100 from the settable range 810 and improve tracking of the subject 301 by the focus position.

As described above, the system control unit 11 predicts (temporarily calculates) the focus position in the third frame subsequent to the first frame and the second frame based on the image data of the first frame and the image data of the second frame among the plurality of frames obtained by the imaging apparatus 100 (imaging unit 50) (for example, refer to FIG. 6).

In addition, the system control unit 11 sets the settable range that is a range of the focus position settable for the third frame based on the state of the subject 301. Specifically, the system control unit 11 determines the state of the subject 301 based on the depth magnification (movement distance information) in the plurality of frames (for example, refer to FIGS. 7A and 7B).

The system control unit 11 sets the focus position of imaging in the third frame based on the predicted focus position and the set settable range (for example, refer to FIG. 6).

Figure 10:
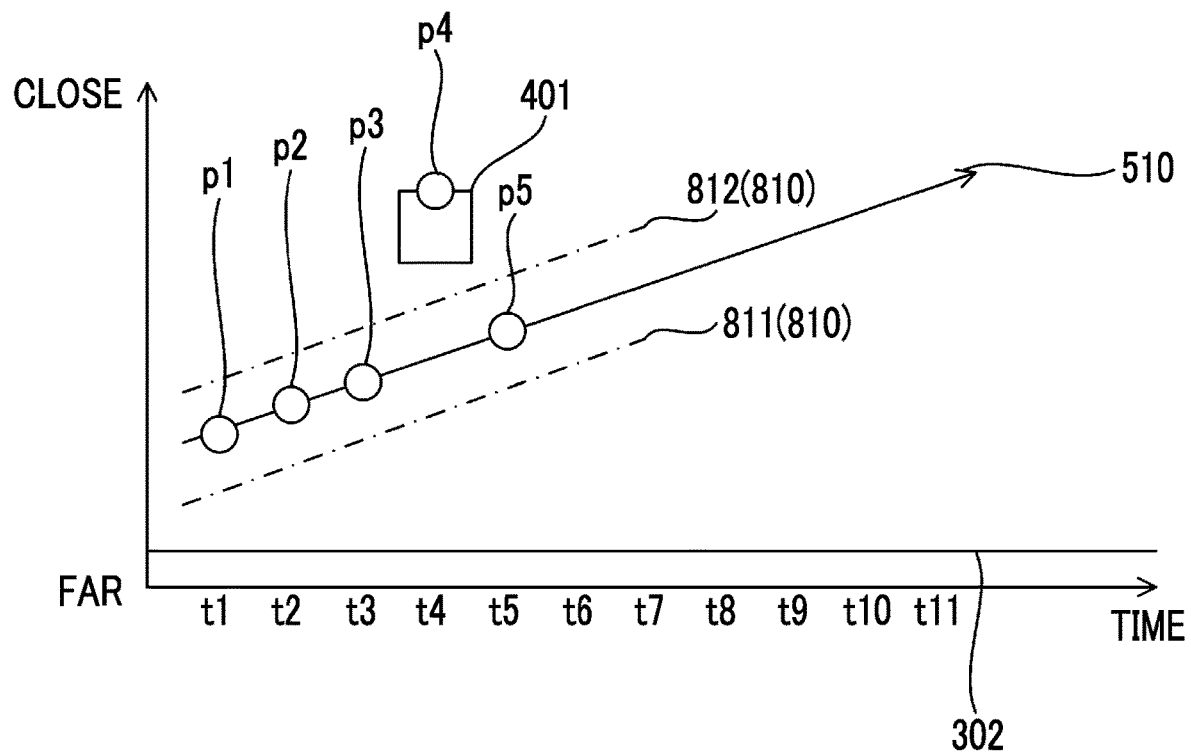
FIG. 10 is a diagram illustrating an example of a control of a focus position in a case where it is determined that a state of the subject is an "obstacle distance measurement" state.

Control of Focus Position in Case where it is Determined that State of Subject is "Obstacle Distance Measurement" State FIG. 10 is a diagram illustrating an example of a control of the focus position in a case where it is determined that the state of the subject 301 is the "obstacle distance measurement" state. For example, as in the example illustrated in FIG. 10, in a situation where the distance between the imaging apparatus 100 and the subject 301 is changing, it is assumed that the obstacle 401 temporarily enters in front of the subject 301 in the AF area 303 and distance measurement of the obstacle 401 is performed. In this case, for example, the system control unit 11 determines that the state of the subject 301 is the "obstacle distance measurement" state based on the distance measurement results p3 to p5.

At this point, in a case where the system control unit 11 maintains the focus position at a time point of the distance measurement result p3 that is before the subject 301 is hidden by the obstacle 401, the subject 301 cannot be focused when the obstacle 401 is not present anymore between the imaging apparatus 100 and the subject 301, because the subject 301 is moving even while the subject 301 is hidden by the obstacle 401.

Regarding this point, the system control unit 11 predicts movement of the subject 301 based on the distance measurement results p1 to p3 previous to the distance measurement result p4 that is the distance measurement result of the obstacle 401, and moves the focus position based on a prediction result even while the subject 301 is hidden by the obstacle 401. Thus, a state where a position close to the subject 301 is focused when the obstacle 401 is not present anymore between the imaging apparatus 100 and the subject 301 can be set.

Figure 11:
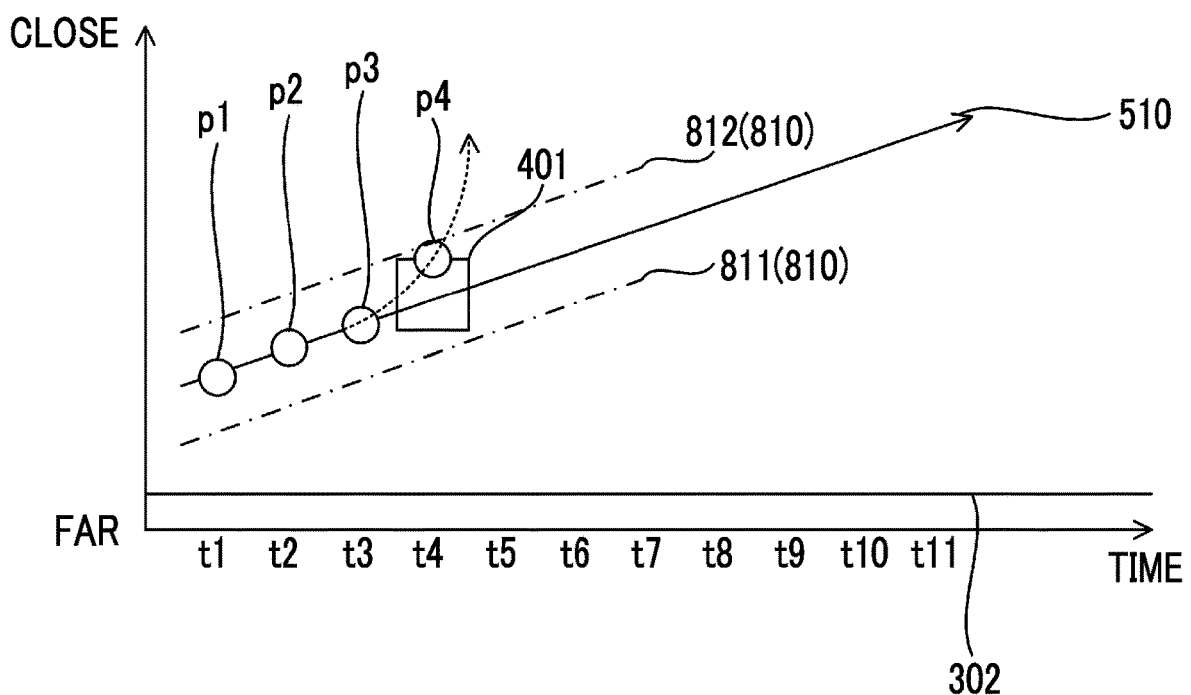
FIG. 11 is a diagram illustrating an example of erroneous determination in a case where a distance between an obstacle 401 and a subject 301 is short.

Erroneous Determination of Case where Distance Between Obstacle 401 and Subject 301 is Short FIG. 11 is a diagram illustrating an example of erroneous determination in a case where a distance between the obstacle 401 and the subject 301 is short. For example, as in the example in FIG. 11, in a case where the distance between the obstacle 401 and the subject 301 is short, setting the normal settable range 810 results in an erroneous determination that the state of the subject 301 is the "acceleration" state at a timing when the obstacle 401 in front of the subject 301 enters the AF area 303 in a situation where the obstacle 401 and the subject 301 cross. That is, an erroneous determination is easily made in a case where a position of the subject 301 is changing as illustrated by a dotted line arrow in FIG. 11. Processing for suppressing the erroneous determination will be described using FIGS. 12A and 12B.

Another Example of Setting of Settable Range 810 by System Control Unit 11

Figure 12B:
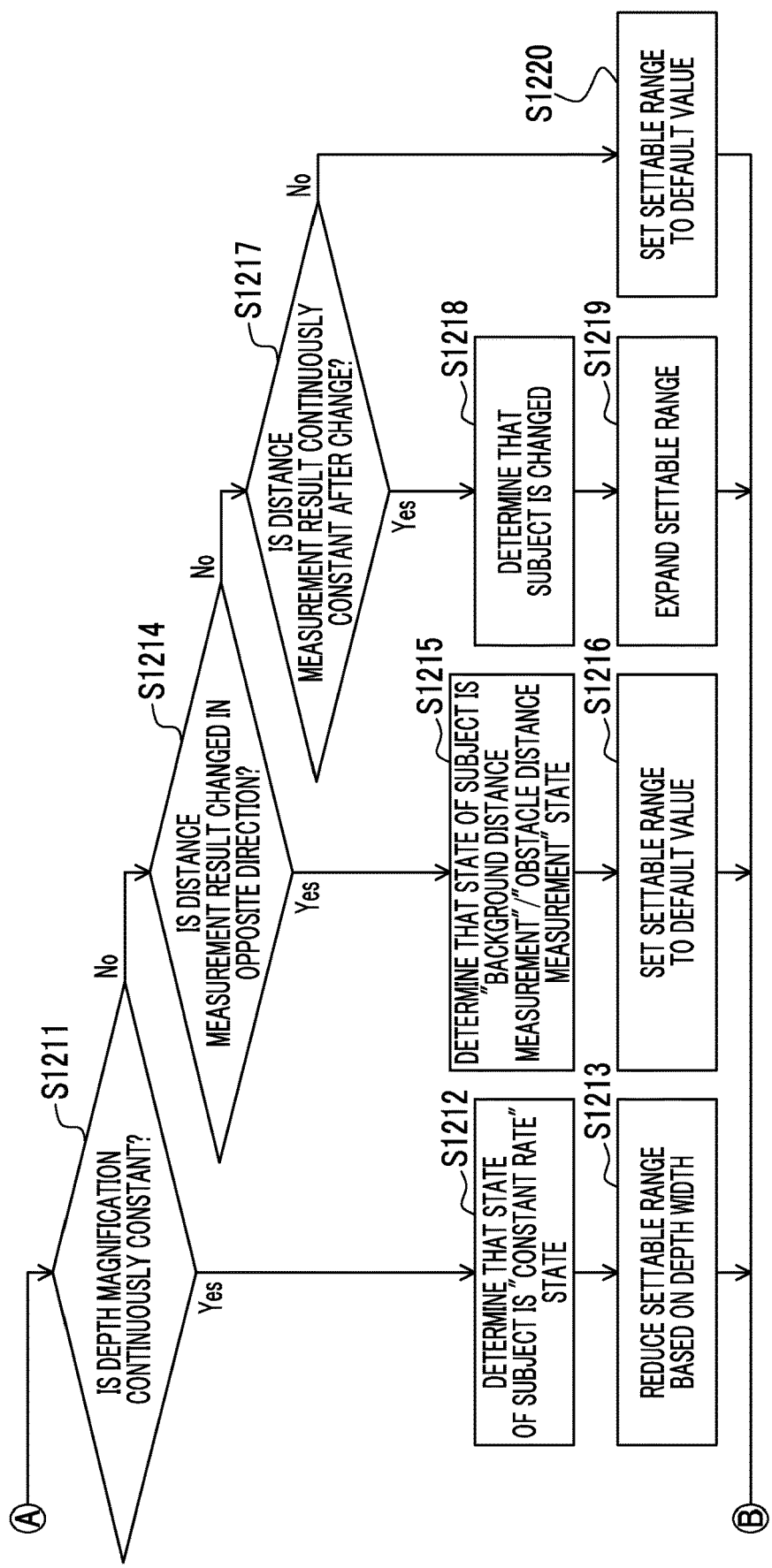

FIGS. 12A and 12B are flowcharts illustrating another example of setting the settable range 810 by the system control unit 11. In step S62 illustrated in FIG. 6, for example, the system control unit 11 reduces the settable range based on the processing illustrated in FIGS. 12A and 12B.

Steps S1201 to S1220 illustrated in FIGS. 12A and 12B are the same as steps S701 to S720 illustrated in FIGS. 7A and 7B. However, in step S1213 in a case where it is determined that the state of the subject 301 is the "constant rate" state, the system control unit 11 reduces the settable range 810 based on a depth width (step S1213). The depth width is a width of change in the depth magnification (drive depth width).

For example, the system control unit 11 acquires the most recent N depth magnifications calculated in step S1201 in the past including the most recent depth magnification calculated in step S1201 and calculates the width of change (for example, a difference between a minimum value and a maximum value) of the N depth magnifications as the depth width. As the calculated depth width is decreased, that is, as the subject 301 approaches a complete constant rate state, the system control unit 11 narrows the settable range 810. Reduction of the settable range 810 based on the processing in FIGS. 12A and 12 B will be described using FIG. 13.

Reduction of Settable Range 810 Based on Depth Width

Figure 13:
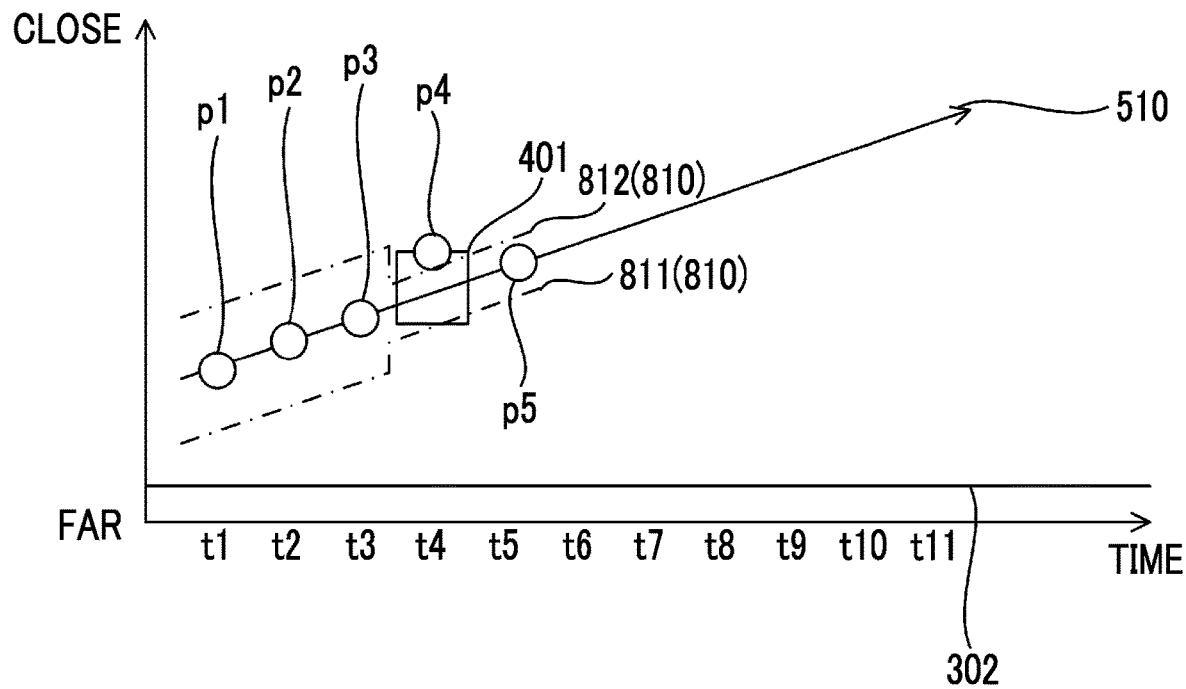
FIG. 13 is a diagram illustrating an example of reducing the settable range 810 based on a depth width.

FIG. 13 is a diagram illustrating an example of reducing the settable range 810 based on the depth width. In the same situation as FIG. 10, for example, the system control unit 11 calculates the depth width based on the distance measurement results p1 to p3 and reduces the settable range 810 based on the calculated depth width. Accordingly, the distance measurement result p4 that is the distance measurement result of the obstacle 401 is separated from the settable range 810 and is not used in the determination or the like of the state of the subject 301. Accordingly, for example, it is possible to suppress an erroneous determination that the state of the subject 301 is the "acceleration" state in the situation illustrated in FIG. 11.

Distance Measurement Result Based on Plurality of AF Areas of Imaging Apparatus 100

Figure 14:
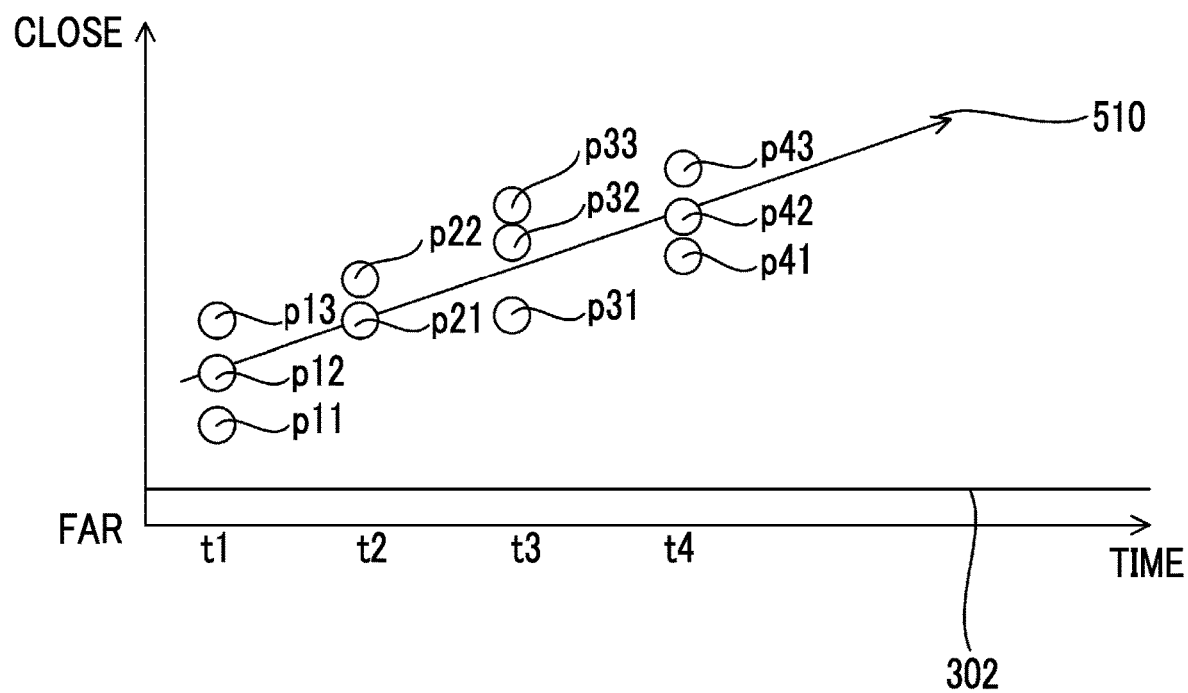
FIG. 14 is a diagram illustrating an example of a distance measurement result based on a plurality of AF areas of the imaging apparatus 100.

FIG. 14 is a diagram illustrating an example of the distance measurement result based on a plurality of AF areas of the imaging apparatus 100. While processing based on the distance measurement result depending on one AF area 303 is described above, the imaging apparatus 100 may have a plurality of AF areas. In this case, a plurality of distance measurement results can be obtained for each frame.

In the example in FIG. 14, distance measurement results p11, p12, and p13 are obtained at time point t1. Distance measurement results p21 and p22 are obtained at time point t2. Distance measurement results p31, p32, and p33 are obtained at time point t3. Distance measurement results p41, p42, and p43 are obtained at time point t4.

For example, in predictive AF in which imaging is performed while a future motion of the subject that is a moving object is predicted, which subject is to be determined as a main subject is an objective. Regarding such an objective, in a general digital camera, there is a system for causing the user to select which AF area such as front priority, center priority, and auto is to be preferentially used in a customized manner. As illustrated in FIG. 15 to FIG. 20 described below, the imaging apparatus 100 includes a system for automatically selecting the main subject to a certain extent.

Plurality of AF Areas of Imaging Apparatus 100

Figure 15:
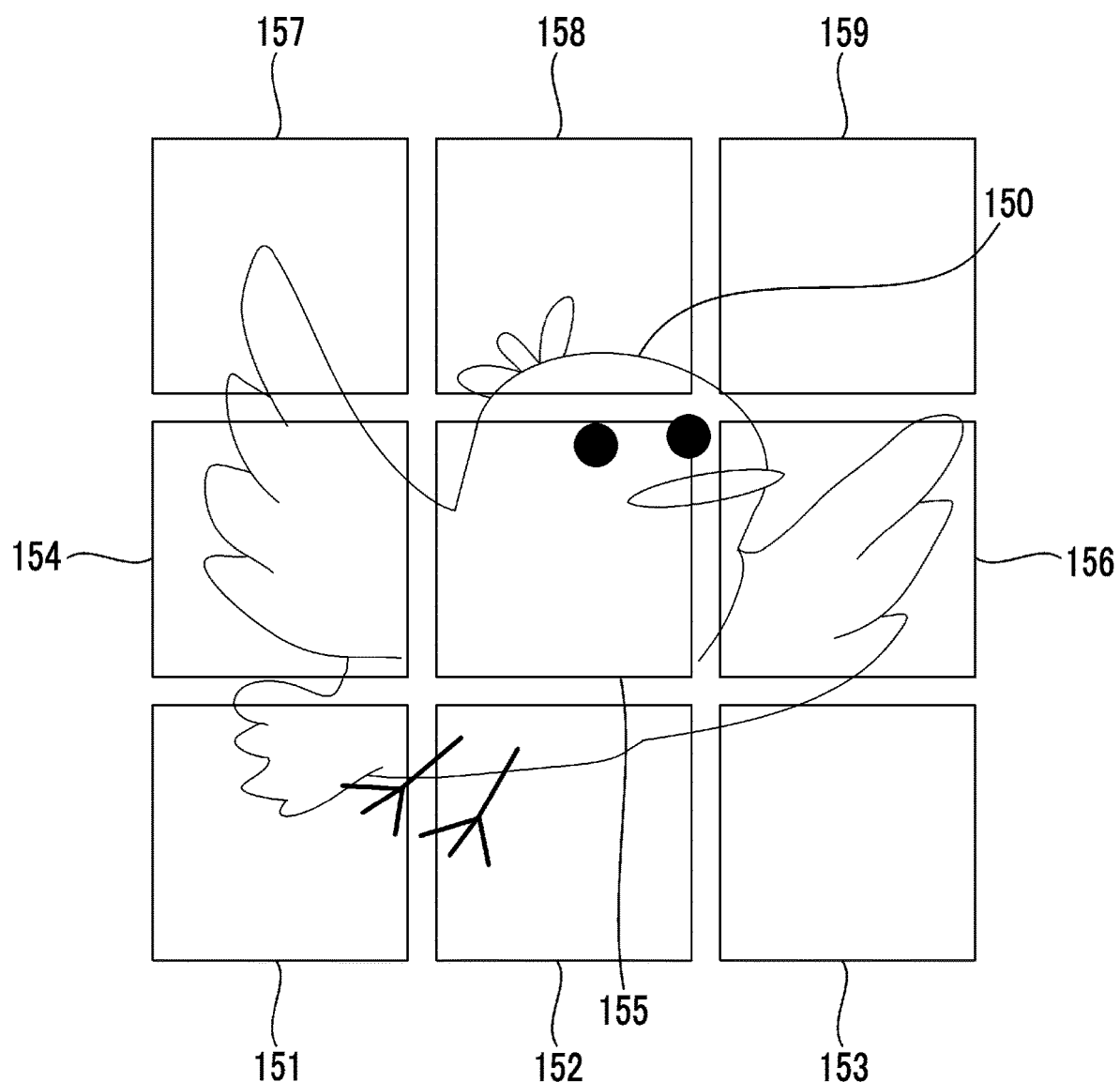
FIG. 15 is a diagram illustrating an example of the plurality of AF areas of the imaging apparatus 100.

FIG. 15 is a diagram illustrating an example of the plurality of AF areas of the imaging apparatus 100. For example, the imaging apparatus 100 may have AF areas 151 to 159. The AF areas 151 to 159 are arranged in a 3×3 matrix, and the AF area 155 is a center area. The AF area 155 is an example of a first area near a center among the AF areas 151 to 159. The AF areas 151 to 154 and 156 to 159 are an example of a second area around the first area.

A subject 150 is a subject of imaging of the imaging apparatus 100 and is a flying bird in the example in FIG. 15. The distance between the subject 150 that is a bird and the imaging apparatus 100 is different depending on parts of the subject 150. Thus, the distance measurement results of the AF areas 151 to 159 are different from each other.

The system control unit 11 sets an AF area of a part of the AF areas 151 to 159 as a priority area and performs each processing (for example, the processing in FIG. 6) described above using the distance measurement result of the set priority area as the distance measurement result of a frame of the priority area. Alternatively, the system control unit 11 performs each processing (for example, the processing in FIG. 6) described above using the distance measurement result calculated by preferentially considering the distance measurement result of the priority area as the distance measurement result of the frame of the priority area.

In this case, using the distance measurement result in which the distance from the imaging apparatus 100 is the smallest among the distance measurement results of the AF areas 151 to 159 is considered. However, in a case where there is a branch of a tree between the subject 150 and the imaging apparatus 100 and the branch of the tree enters any of the AF areas 151 to 159, the branch of the tree is focused. In addition, for example, in a case where the subject 150 is a person standing on the ground, the ground is focused in a case where the ground between the subject 150 and the imaging apparatus 100 enters any of the AF areas 151 to 159.

In addition, while using a center distance or the like of a distance range in which a large number of distance measurement results among the distance measurement results of the AF areas 151 to 159 are distributed is considered, there is a problem of front focusing or rear focusing.

Processing of Setting Priority Area by System Control Unit 11

Figure 16:
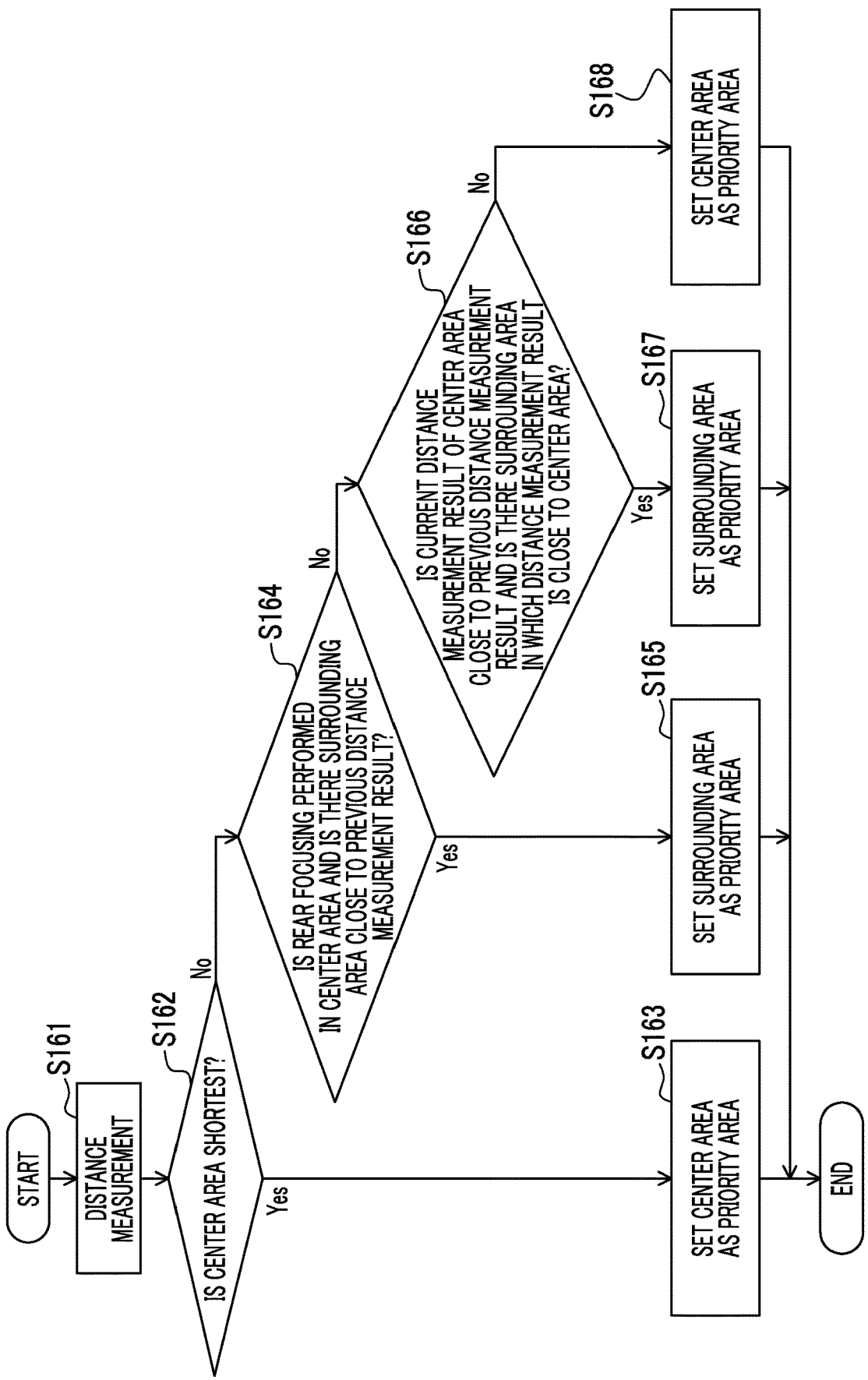
FIG. 16 is a flowchart illustrating an example of processing of setting a priority area by the system control unit 11.

FIG. 16 is a flowchart illustrating an example of processing of setting the priority area by the system control unit 11. For each continuous frame of imaging, for example, the system control unit 11 sets the priority area from the AF areas 151 to 159 based on the processing illustrated in FIG. 16.

First, the system control unit 11 performs distance measurement of the AF areas 151 to 159 (step S161). Next, the system control unit 11 determines whether or not the distance measurement result of the AF area 155 that is the center area is the shortest based on the distance measurement result of each of the AF areas 151 to 159 obtained in step S161 (step S162). Specifically, the system control unit 11 determines whether or not the distance measurement result of the AF area 155 is the shortest by determining whether or not the distance measurement result of the AF area 155 indicates the shortest distance among the distance measurement results of the AF areas 151 to 159.

In step S162, in a case where the distance measurement result of the AF area 155 is the shortest (step S162: Yes), the system control unit 11 sets the AF area 155 as the priority area (step S163) and finishes the series of processing.

In step S162, in a case where the distance measurement result of the AF area 155 is not the shortest (step S162: No), the system control unit 11 determines whether or not rear focusing is performed in the AF area 155 that is the center area and there is a surrounding area in which a distance measurement result close to the previous distance measurement result (for example, the distance measurement result of the previous priority area) is obtained among the AF areas 151 to 154 and 156 to 159 that are surrounding areas (step S164). The current distance measurement result is the distance measurement result of the second frame (for example, the most recent frame in the past). The previous distance measurement result is the distance measurement result of the first frame (for example, the frame immediately previous to the second frame).

In step S164, for example, the system control unit 11 determines whether or not rear focusing is performed in the AF area 155 by determining whether or not the distance measurement result of the AF area 155 is greater than a reference value based on the distance measurement result of each of the AF areas 151 to 154 and 156 to 159 by a predetermined degree or more. For example, the reference value based on the distance measurement result of each of the AF areas 151 to 154 and 156 to 159 may be an average value of the distance measurement results of the AF areas 151 to 154 and 156 to 159 or a minimum value of the distance measurement results of the AF areas 151 to 154 and 156 to 159.

In addition, for each of the AF areas 151 to 154 and 156 to 159, the system control unit 11 determines whether or not the current distance measurement result is close to the previous distance measurement result by determining whether or not a difference between the current distance measurement result and the previous distance measurement result (for example, the distance measurement result of the previous priority area) is less than a predetermined value.

In step S164, in a case where rear focusing is performed in the AF area 155 and there is a surrounding area in which the distance measurement result close to the previous distance measurement result is obtained, the surrounding area is set as the priority area (step S165), and the series of processing is finished. Accordingly, in a case where the AF area 155 cannot be used because of rear focusing in the AF area 155, a surrounding area in which a distance measurement result close to the previous distance measurement result is obtained, that is, a surrounding area in which a possibility that the same part as in the previous priority area out of the subject 150 has entered is high, can be set as the priority area. In a case where there are a plurality of surrounding areas in which a distance measurement result close to the previous distance measurement result is obtained, the system control unit 11 sets the surrounding area in which a distance measurement result closest to the previous distance measurement result is obtained as the priority area.

In step S164, in a case where rear focusing is not performed in the AF area 155 or there is no surrounding area in which a distance measurement result close to the previous distance measurement result is obtained (step S164: No), the system control unit 11 determines whether or not the current distance measurement result of the AF area 155 that is the center area is close to the previous distance measurement result (for example, the distance measurement result of the previous priority area) and there is a surrounding area in which the distance measurement result is close to the AF area 155 among the AF areas 151 to 154 and 156 to 159 that are surrounding areas (step S166).

In step S166, for example, the system control unit 11 determines whether or not the current distance measurement result of the AF area 155 is close to the previous distance measurement result by determining whether or not a difference between the previous distance measurement result (for example, the distance measurement result of the previous priority area) and the current distance measurement result of the AF area 155 is less than a predetermined value. In addition, the system control unit 11 determines whether or not the distance measurement result is close to the AF area 155 for each of the AF areas 151 to 154 and 156 to 159 as a target surrounding area by determining whether or not a difference between the current distance measurement result of the AF area 155 and the current distance measurement result of the target surrounding area is less than a predetermined value.

In step S166, in a case where the current distance measurement result of the AF area 155 is close to the previous distance measurement result and there is a surrounding area in which the distance measurement result is close to the AF area 155 (step S166: Yes), the system control unit 11 sets the surrounding area as the priority area (step S167) and finishes the series of processing. Accordingly, in a case where the AF area 155 is not the shortest but is close to the previous distance measurement result, the surrounding area in which the distance measurement result is close to the AF area 155 can be set as the priority area. In a case where there are a plurality of surrounding areas in which the distance measurement result is close to the AF area 155, the system control unit 11 sets the surrounding area in which the distance measurement result is the closest to the AF area 155 as the priority area.

In step S166, in a case where the current distance measurement result of the AF area 155 is not close to the previous distance measurement result or there is no surrounding area in which the distance measurement result is close to the AF area 155 (step S166: No), the system control unit 11 sets the AF area 155 that is the center area as the priority area (step S168) and finishes the series of processing.

Figure 17:
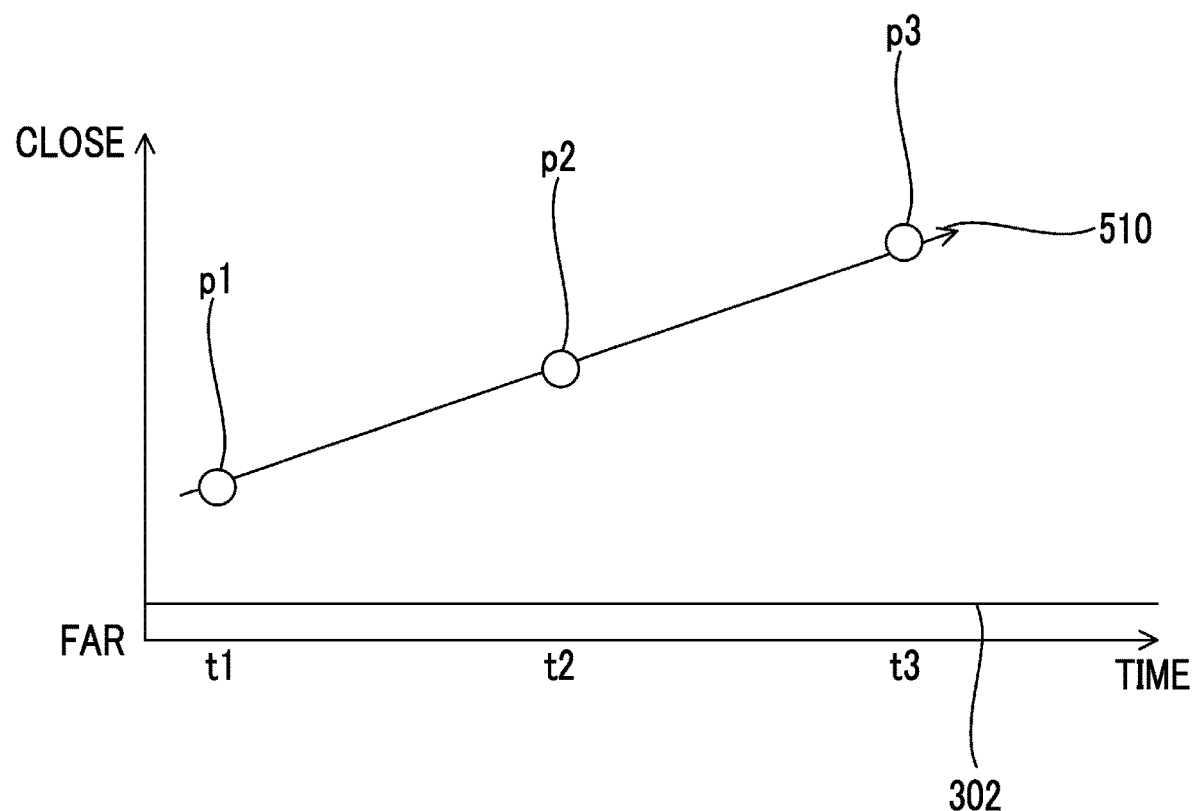
FIG. 17 is a diagram (Part 1) illustrating an example of acquiring a distance measurement result of the priority area.

For example, in the processing illustrated in FIG. 6, the system control unit 11 uses the distance measurement result of the priority area set based on FIG. 17 among the distance measurement results of the AF areas 151 to 159 as the distance measurement result of a target frame. Alternatively, in the processing illustrated in FIG. 6, the system control unit 11 may use the distance measurement result calculated by preferentially considering the distance measurement result of the priority area as the distance measurement result of the target frame.

Acquisition of Distance Measurement Result of Priority Area

FIG. 17 to FIG. 20 are diagrams illustrating an example of acquiring the distance measurement result of the priority area. In FIG. 17, the distance measurement result p1 at time point t1 is the distance measurement result of the priority area selected for time point t1 from the AF areas 151 to 159 based on the processing in FIG. 16. The distance measurement result p2 at time point t2 is the distance measurement result of the priority area selected for time point t2 from the AF areas 151 to 159 based on the processing in FIG. 16. The distance measurement result p3 at time point t3 is the distance measurement result of the priority area selected for time point t3 from the AF areas 151 to 159 based on the processing in FIG. 16.

Figure 18:
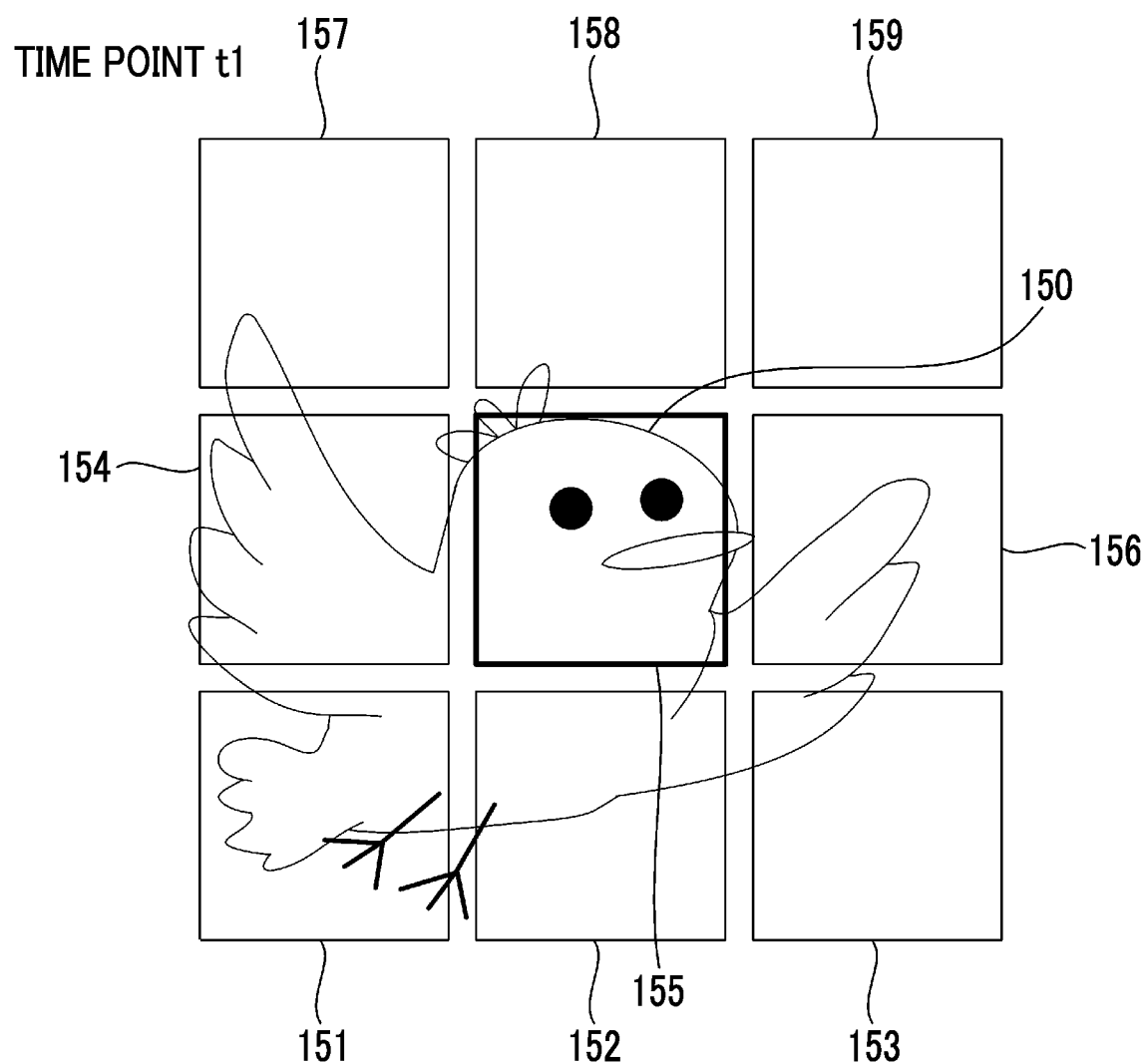
FIG. 18 is a diagram (Part 2) illustrating an example of acquiring the distance measurement result of the priority area.
Figure 19:
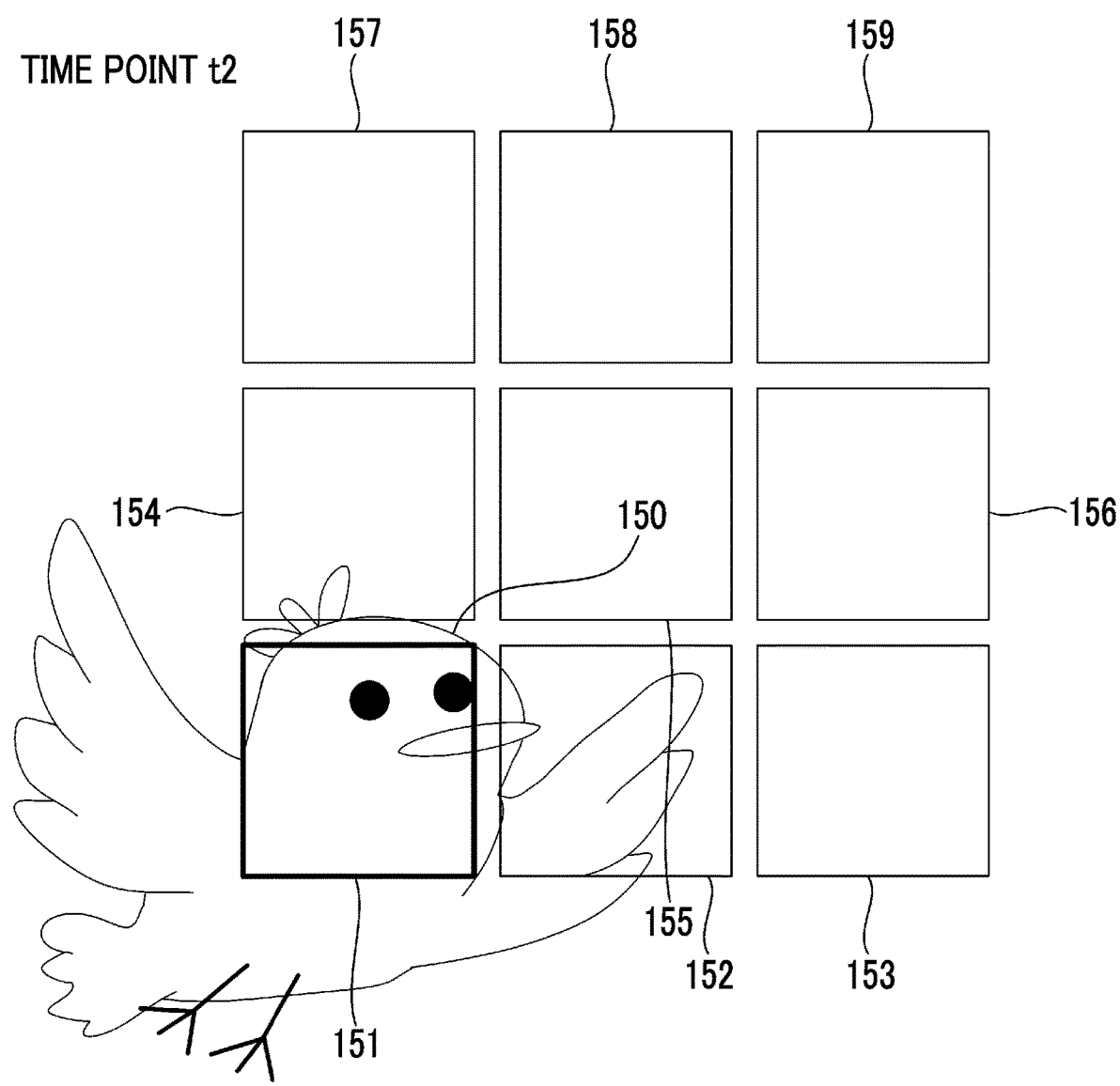
FIG. 19 is a diagram (Part 3) illustrating an example of acquiring the distance measurement result of the priority area.
Figure 20:
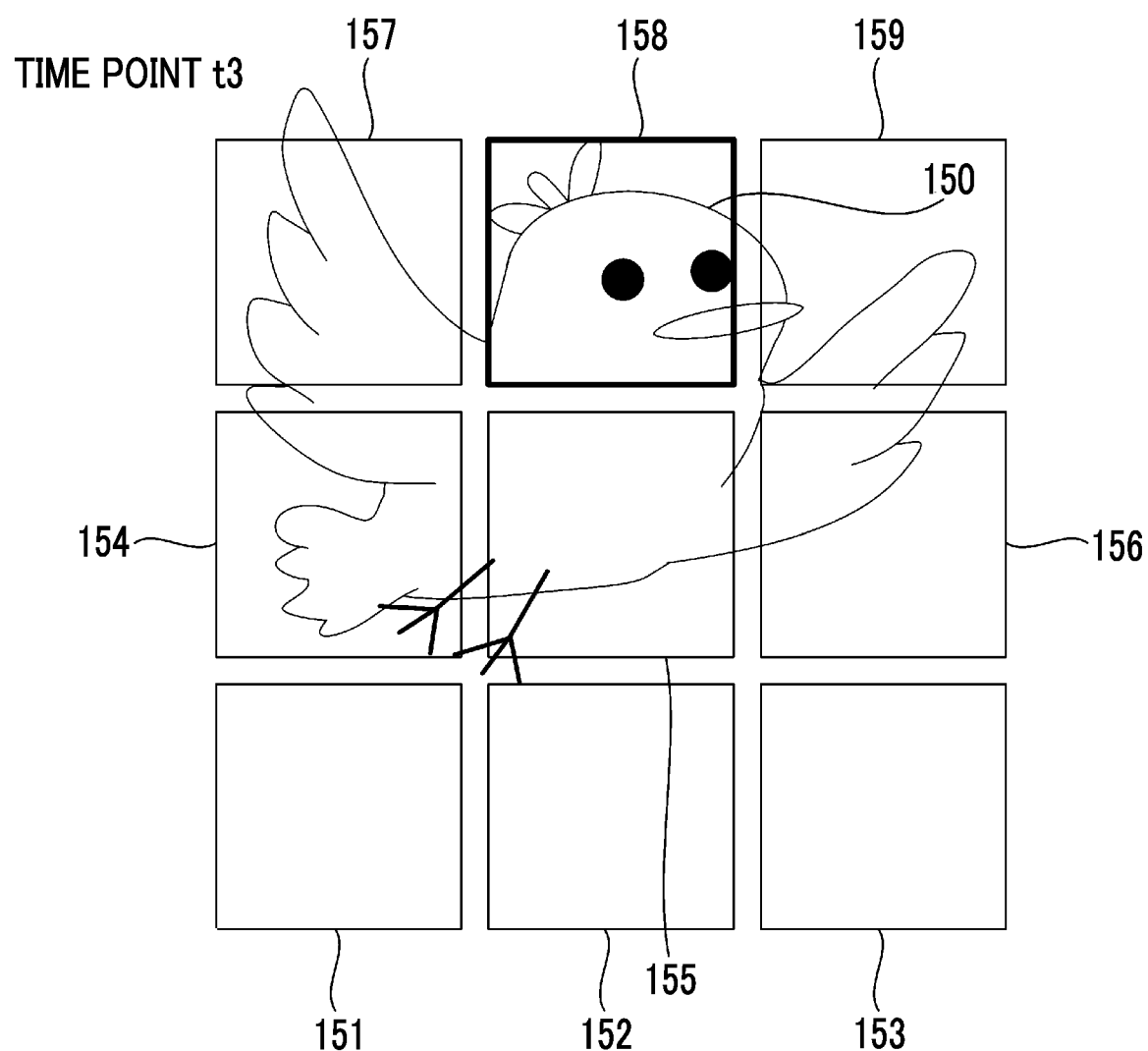
FIG. 20 is a diagram (Part 4) illustrating an example of acquiring the distance measurement result of the priority area.

FIG. 18 to FIG. 20 illustrate an example of a positional relationship between the AF areas 151 to 159 and the subject 150 at time points t1 to t3, respectively. In FIG. 18 to FIG. 20, the AF area selected as the priority area among the AF areas 151 to 159 is illustrated by a thick line.

As illustrated in FIG. 18, at time point t1, a part of the subject 150 (for example, a beak of the bird) closest to the imaging apparatus 100 has entered the AF area 155. In this case, in the processing in FIG. 16, the AF area 155 that is the center area is determined to be the shortest, and the AF area 155 is set as the priority area in step S163. In this case, the distance measurement result p1 at time point t1 in FIG. 17 is the distance measurement result of the AF area 155 at time point t1.

As illustrated in FIG. 19, at time point t2, a state where the subject 150 has not entered the AF area 155 and rear focusing is performed in the AF area 155 occurs. In addition, it is assumed that the distance measurement result of the AF area 151 at time point t2 is close to the measurement result at time point t1 (distance measurement result of time point t1 of the AF area 155 set as the priority area at time point t1). In this case, in the processing in FIG. 16, the AF area 151 is set as the priority area in step S165. In this case, the distance measurement result p2 at time point t2 in FIG. 17 is the distance measurement result of the AF area 151 at time point t2.

As illustrated in FIG. 20, it is assumed that at time point t3, the distance measurement result of the AF area 155 is close to the measurement result at time point t2 (distance measurement result of time point t2 of the AF area 151 set as the priority area at time point t2). In addition, it is assumed that the distance measurement result of the AF area 158 is close to the distance measurement result of the AF area 155. In this case, in the processing in FIG. 16, the AF area 158 is set as the priority area in step S167. In this case, the distance measurement result p3 at time point t3 in FIG. 17 is the distance measurement result of the AF area 158 at time point t3.

As illustrated in FIG. 14 to FIG. 20, the system control unit 11 sets the target focus position of the third frame based on the current (second frame) distance measurement result of each of the AF areas 151 to 159 and the previous (first frame) distance measurement result of each of the AF areas 151 to 159. Accordingly, by using distance measurement results in time series in the past, the target focus position of the third frame can be set using an appropriate distance measurement result among the distance measurement results of the AF areas 151 to 159. Thus, it is possible to improve tracking of the subject 150 by the focus position.

The system control unit 11 sets the target focus position of the third frame based on a comparison between the distance measurement result (distance information) of the AF area 155 (first area near the center) among the AF areas 151 to 159 (plurality of areas) and the distance measurement results of the AF areas 151 to 154 and 156 to 159 (surrounding second area) among the AF areas 151 to 159. Accordingly, the target focus position of the third frame can be set using an appropriate distance measurement result among the distance measurement results of the AF areas 151 to 154 and 156 to 159 in accordance with a relationship with the distance measurement result of the AF area 155 that is generally set to the subject 150. Thus, it is possible to improve tracking of the subject 150 by the focus position.

MODIFICATION EXAMPLE 1

While the depth magnification calculated based on Expression (1) is described as an example of the movement distance information that is information related to the amount of change in the distance between the imaging apparatus 100 and the subject, the movement distance information is not limited to the depth magnification. For example, the movement distance information may be the AF drive amount in Expression (1).

In addition, the movement distance information may be an angle formed between a combined vector of an AF drive amount vector and a depth of field vector, and the depth of field vector. The AF drive amount vector is a vector indicating the AF drive amount in Expression (1). The depth of field vector is a vector indicating the depth of field in Expression (1). Accordingly, a range in which the movement distance information may be acquired is restricted to a constant range, and design of a threshold value or the like in determining the state or the like of the subject 301 is easily performed.

MODIFICATION EXAMPLE 2

In the embodiment, while a case of using the phase difference method as a distance measurement method (AF method) is described, a contrast method used in contrast AF may be configured to be used as the distance measurement method. In addition, a hybrid method in which the phase difference method and the contrast method are combined may be configured to be used as the distance measurement method.

MODIFICATION EXAMPLE 3

The imaging apparatus according to the embodiment of the present invention is not limited to the imaging apparatus 100 of which a main application is imaging, and can also be applied to various information terminals having an imaging function, such as a smartphone, a tablet terminal, and a laptop personal computer. Next, a configuration of a smartphone 200 that is another embodiment of the imaging apparatus according to the present invention will be described.

Exterior of Smartphone 200

Figure 21:
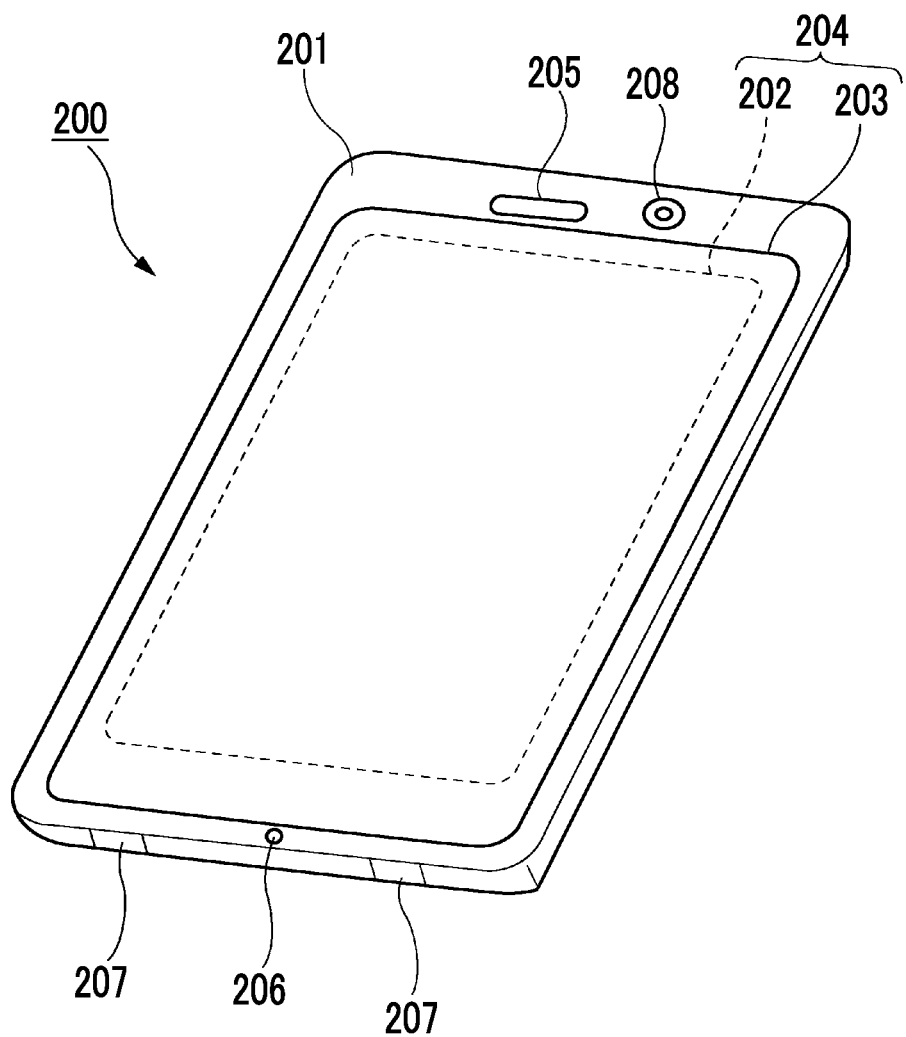
FIG. 21 illustrates an exterior of a smartphone 200.

FIG. 21 illustrates an exterior of the smartphone 200. The smartphone 200 illustrated in FIG. 21 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and may employ, for example, a configuration in which the display unit and the input unit are independently disposed, or a configuration that has a folded structure or a sliding mechanism.

Configuration of Smartphone 200

Figure 22:
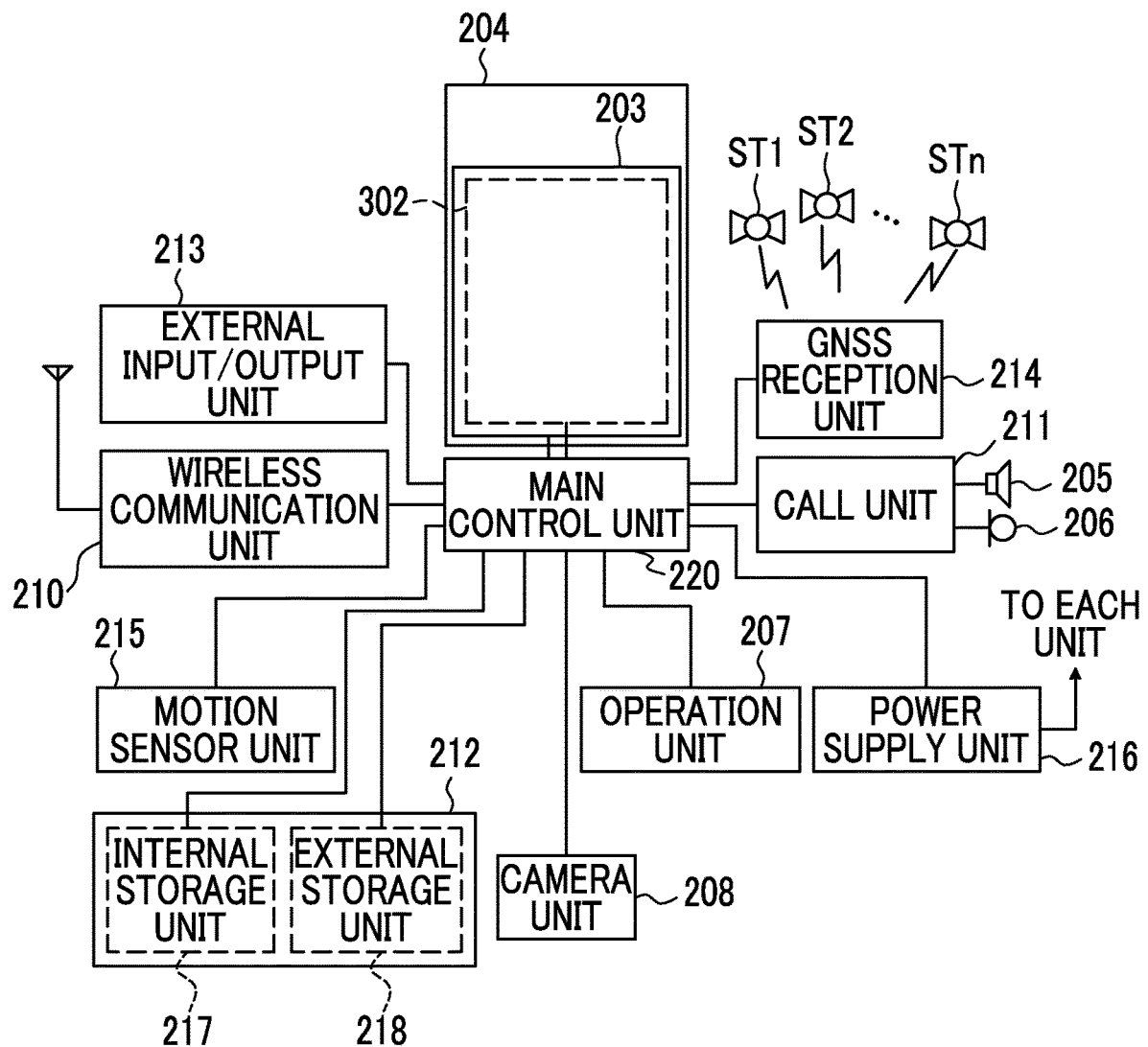
FIG. 22 is a block diagram illustrating a configuration of the smartphone 200.

FIG. 22 is a block diagram illustrating a configuration of the smartphone 200.

As illustrated in FIG. 22, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS included in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 22, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge portion other than the overlapping part that does not overlap with the display panel 202.

A size of the display region and a size of the display panel 202 may completely match, but both sizes do not need to match. In addition, the operation panel 203 may comprise two sensitive regions of the outer edge portion and an inner part other than the outer edge portion. Furthermore, a width of the outer edge portion is appropriately designed depending on a size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 21, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 21, the operation unit 207 is a push-button type switch that is mounted on a side surface of the casing 201 of the smartphone 200 and is set to an ON state in a case where the switch is pressed by the finger or the like, and set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication (for example, Universal Serial Bus (USB), Institute of Electrical and Electronics Engineers (IEEE) 1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, the Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation based on the received plurality of GNSS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. A detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. The microprocessor of the main control unit 220 has the same function as the system control unit 11. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying an image on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes a display control for the display panel 202 and an operation detection control for detecting the user operation through the operation unit 207 and the operation panel 203.

By executing the display control, the main control unit 220 displays an icon for starting the application software or a software key such as a scroll bar or displays a window for creating an electronic mail. The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 is provided with a touch panel control function of determining whether the operation position on the operation panel 203 is in the overlapping part (display region) overlapping with the display panel 202 or the other outer edge portion (non-display region) not overlapping with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes the imaging unit 50 in the imaging apparatus 100 illustrated in FIG. 1.

Captured image data generated by the camera unit 208 can be stored in the storage unit 212 or be output through the external input-output unit 213 or the wireless communication unit 210.

In the smartphone 200 illustrated in FIG. 21, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GNSS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or by using the three-axis acceleration sensor together. The image from the camera unit 208 can also be used in the application software.

Besides, image data of a still picture or a motion picture to which the positional information acquired by the GNSS reception unit 214, voice information (may be text information acquired by performing voice to text conversion by the main control unit or the like) acquired by the microphone 206, posture information acquired by the motion sensor unit 215, or the like is added can be stored in the storage unit 212 or be output through the external input-output unit 213 or the wireless communication unit 210.

Even in the smartphone 200 having the above configuration, it is possible to improve tracking of the subject by the focus position as in the imaging apparatus 100.

As described above, the following matters are disclosed in the present specification.

(1) A control device that controls an imaging apparatus, the control device comprising a processor, in which the processor is configured to, based on image data of a first frame and image data of a second frame among a plurality of frames obtained by the imaging apparatus, predict distance information related to a distance between the imaging apparatus and a subject in a third frame subsequent to the first frame and the second frame, and set a settable range that is a range of a focus position of imaging of the imaging apparatus settable for the third frame based on a state of the subject.

(2) The control device according to (1), in which the processor is configured to set the focus position in the third frame based on the predicted distance information in the third frame and the set settable range.

(3) The control device according to (1) or (2), in which the processor is configured to, based on image data of the plurality of frames, acquire movement distance information that is information related to an amount of change in the distance between the imaging apparatus and the subject, and set the settable range for the third frame based on the movement distance information in the plurality of frames.

(4) The control device according to (3), in which the processor is configured to set the settable range for the third frame based on a difference in the movement distance information among the plurality of frames.

(5) The control device according to (3) or (4), in which the processor is configured to expand the settable range in a case where the movement distance information in the plurality of frames is increased.

(6) The control device according to any one of (3) to (5), in which the processor is configured to maintain or reduce the settable range in a case where the movement distance information in the plurality of frames is decreased.

(7) The control device according to any one of (3) to (6), in which the processor is configured to maintain or reduce the settable range in a case where a difference in the movement distance information among the plurality of frames is within a predetermined range.

(8) The control device according to any one of (3) to (7), in which the processor is configured to maintain or reduce the settable range in a case where a direction of change in the distance information among the plurality of frames is switched to an opposite direction.

(9) The control device according to any one of (3) to (8), in which the processor is configured to expand the settable range in a case where the distance information in the plurality of frames is within a predetermined range after change by a predetermined value or more.

(10) The control device according to any one of (3) to (9), in which the movement distance information is a ratio of an amount of change in the distance of the imaging apparatus and the subject between frames and a depth of field.

(11) The control device according to any one of (1) to (10), in which the processor is configured to acquire a plurality of pieces of the distance information corresponding to a plurality of areas of an image represented by the image data and predict the distance information of the third frame based on the plurality of pieces of distance information of the first frame and the plurality of pieces of distance information of the second frame.

(12) The control device according to (11), in which the processor is configured to predict the distance information of the third frame based on a comparison between the distance information of a first area near a center among the plurality of areas and the distance information of a second area around the first area among the plurality of areas.

(13) An imaging apparatus comprising the control device according to any one of (1) to (12).

(14) A control method by a control device that includes a processor and controls an imaging apparatus, the control method comprising predicting, by the processor, based on image data of a first frame and image data of a second frame among a plurality of frames obtained by the imaging apparatus, distance information related to a distance between the imaging apparatus and a subject in a third frame subsequent to the first frame and the second frame, and setting, by the processor, a settable range that is a range of a focus position of imaging of the imaging apparatus settable for the third frame based on a state of the subject.

(15) A control program of a control device that includes a processor and controls an imaging apparatus, the control program causing the processor to execute a process comprising predicting, based on image data of a first frame and image data of a second frame among a plurality of frames obtained by the imaging apparatus, distance information related to a distance between the imaging apparatus and a subject in a third frame subsequent to the first frame and the second frame, and setting a settable range that is a range of a focus position of imaging of the imaging apparatus settable for the third frame based on a state of the subject.

The present invention is particularly applied to a digital camera or the like to provide high convenience and effectiveness.

EXPLANATION OF REFERENCES

1: imaging lens
4: lens control unit
5: imaging element
8: lens drive unit
9: stop drive unit
10: imaging element drive unit
11: system control unit
14, 207: operation unit
15: memory control unit
16: memory
17: digital signal processing unit
20: external memory control unit
21: recording medium
22: display device
22a: display controller
22b: display surface
24: control bus
25: data bus
40: lens device
50: imaging unit
60: imaging surface
61: pixel
61a: normal pixel
61b, 61c: distance measurement pixel
62, 63: pixel line
64: drive circuit 65: signal processing circuit
100: imaging apparatus
100A: main body unit
150, 301: subject
151 to 159, 303: AF area
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit
300: image
302: background
401: obstacle
510: subject position change
810: settable range
811: lower limit value
812: upper limit value
ST1 to STn: GNSS satellite

What is claimed is:

1. A control device that controls an imaging apparatus, the control device comprising:
a processor,
wherein the processor is configured to:
based on image data of a first frame and image data of a second frame among a plurality of frames obtained by the imaging apparatus, predict distance information related to a distance between the imaging apparatus and a subject in a third frame subsequent to the first frame and the second frame;
based on image data of the plurality of frames, acquire movement distance information that is a ratio of a depth of field and an amount of change, in the distance between the imaging apparatus and the subject, between frames; and
based on the movement distance information in the plurality of frames, set a settable range that is a range of a focus position of imaging of the imaging apparatus settable for the third frame.

2. The control device according to claim 1,
wherein the processor is configured to:
set the focus position in the third frame based on the predicted distance information in the third frame and the set settable range.

3. The control device according to claim 1,
wherein the processor is configured to:
set the settable range for the third frame based on a difference in the movement distance information among the plurality of frames.

4. The control device according to claim 1,
wherein the processor is configured to:
expand the settable range in a case where the movement distance information in the plurality of frames is increased.

5. The control device according to claim 1,
wherein the processor is configured to:
maintain or reduce the settable range in a case where the movement distance information in the plurality of frames is decreased.

6. The control device according to claim 1,
wherein the processor is configured to:
maintain or reduce the settable range in a case where a difference in the movement distance information among the plurality of frames is within a predetermined range.

7. The control device according to claim 1,
wherein the processor is configured to:
maintain or reduce the settable range in a case where a direction of change in the distance information among the plurality of frames is switched to an opposite direction.

8. The control device according to claim 1,
wherein the processor is configured to:
expand the settable range in a case where the distance information in the plurality of frames is within a predetermined range after change by a predetermined value or more.

9. The control device according to claim 1,
wherein the processor is configured to:
acquire a plurality of pieces of the distance information corresponding to a plurality of areas of an image represented by the image data and predict the distance information of the third frame based on the plurality of pieces of distance information of the first frame and the plurality of pieces of distance information of the second frame.

10. The control device according to claim 9,
wherein the processor is configured to:
predict the distance information of the third frame based on a comparison between the distance information of a first area near a center among the plurality of areas and the distance information of a second area around the first area among the plurality of areas.

11. An imaging apparatus comprising:
the control device according to claim 1.

12. A control method by a control device that includes a processor and controls an imaging apparatus, the control method comprising:
predicting, by the processor, based on image data of a first frame and image data of a second frame among a plurality of frames obtained by the imaging apparatus, distance information related to a distance between the imaging apparatus and a subject in a third frame subsequent to the first frame and the second frame;
acquiring, by the processor, based on image data of the plurality of frames, movement distance information that is a ratio of a depth of field and an amount of change, in the distance between the imaging apparatus and the subject, between frames; and
setting, by the processor, a settable range that is a range of a focus position of imaging of the imaging apparatus settable for the third frame based on the movement distance information in the plurality of frames.

13. A non-transitory computer readable medium storing a control program of a control device that includes a processor and controls an imaging apparatus, the control program causing the processor to execute a process comprising:
predicting, based on image data of a first frame and image data of a second frame among a plurality of frames obtained by the imaging apparatus, distance information related to a distance between the imaging apparatus and a subject in a third frame subsequent to the first frame and the second frame;

acquiring, based on image data of the plurality of frames, movement distance information that is a ratio of a depth of field and an amount of change, in the distance between the imaging apparatus and the subject, between frames; and setting, based on the movement distance information in the plurality of frames, a settable range that is a range of a focus position of imaging of the imaging apparatus settable for the third frame.

\* \* \* \* \*